(12) United States Patent
Gurajada et al.

(10) Patent No.: US 10,664,462 B2
(45) Date of Patent: May 26, 2020

(54) IN-MEMORY ROW STORAGE ARCHITECTURE

(71) Applicant: SAP SE, Walldorf (DE)

(72) Inventors: Aditya Gurajada, Hyderabad (IN); Amit Pathak, Pune (IN); Paresh Rathod, Pune (IN); Rahul Mittal, Pune (IN); Swati Sharma, Bangalore (IN)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 15/859,175

(22) Filed: Dec. 29, 2017

(65) Prior Publication Data

US 2018/0253467 A1 Sep. 6, 2018

Related U.S. Application Data

(60) Provisional application No. 62/521,513, filed on Jun. 18, 2017.

(51) Int. Cl.
| | |
|---|---|
| *G06F 17/00* | (2019.01) |
| *G06F 16/22* | (2019.01) |
| *G06F 11/14* | (2006.01) |
| *G06F 16/27* | (2019.01) |
| *G06F 16/23* | (2019.01) |

(Continued)

(52) U.S. Cl.
CPC .......... *G06F 16/2255* (2019.01); *G06F 3/061* (2013.01); *G06F 3/0604* (2013.01); *G06F 3/065* (2013.01); *G06F 3/0644* (2013.01); *G06F 3/0653* (2013.01); *G06F 3/0673* (2013.01); *G06F 11/1471* (2013.01); *G06F 11/1474* (2013.01); *G06F 12/0253* (2013.01); *G06F 16/22* (2019.01); *G06F 16/2272* (2019.01); *G06F 16/2282* (2019.01); *G06F 16/2379* (2019.01); *G06F 16/27* (2019.01);
(Continued)

(58) Field of Classification Search
CPC ...... G06F 16/2255; G06F 16/27; G06F 16/22; G06F 16/2379
USPC .................................................. 707/600–899
See application file for complete search history.

(56) References Cited

U.S. PATENT DOCUMENTS

| | | |
|---|---|---|
| 6,023,744 A | 2/2000 | Shoroff |
| 6,041,344 A | 3/2000 | Bodamer |

(Continued)

OTHER PUBLICATIONS

Ailamaki, Anastassia, et al., "DBMSs on a modern processor: Where does time go?." *VLDB 99, Proceedings of 25th International Conference on Very Large Data Bases*, Sep. 7-10, 1999, Edinburgh, Scotland, UK. No. DIAS-CONF-1999-001. 1999 (12 pages).

(Continued)

*Primary Examiner* — Isaac M Woo
(74) *Attorney, Agent, or Firm* — Mintz Levin Cohn Ferris Glovsky and Popeo, P.C.

(57) ABSTRACT

A system for an in-memory row storage architecture can be provided. In some implementations, the system performs operations comprising determining that data stored at a first location in a persistent page store is active, copying the data to a second location in an in-memory row store in response to determining that the data is active, indexing the data in an index table in response to determining that the data is active, accessing the data at the second location in the in-memory row store based on the index table, and performing an update of the data in the in-memory row store. Related systems, methods, and articles of manufacture are also described.

20 Claims, 18 Drawing Sheets

(51) Int. Cl.
*G06F 3/06* (2006.01)
*G06F 12/02* (2006.01)

(52) U.S. Cl.
CPC ...... *G06F 2201/80* (2013.01); *G06F 2201/82* (2013.01); *G06F 2212/1044* (2013.01)

(56) References Cited

U.S. PATENT DOCUMENTS

| | | |
|---|---|---|
| 9,052,942 B1 | 6/2015 | Barber |
| 9,405,788 B2 | 8/2016 | Kliewe |
| 9,600,501 B1 | 3/2017 | Fuller |
| 2017/0147618 A1* | 5/2017 | Geissinger .............. G06F 16/25 |

OTHER PUBLICATIONS

Diaconu, Cristian, et al., "Hekaton: SQL server's memory-optimized OLTP engine." *Proceedings of the 2013 ACM SIGMOD International Conference on Management of Data.* ACM, 2013 (12 pages).
Grund, Martin, et al., "HYRISE: A Main Memory Hybrid Storage Engine." *Proceedings of the VLDB Endowment* 4.2 (2010): 105-116 (12 pages).
Harizopoulos, Stavros, et al., "OLTP Through the Looking Glass, and What We Found There." *Proceedings of the 2008 ACM SIGMOD international conference on Management of data.* ACM, 2008, pp. 981-992.
Hertz, Matthew, and Emery D. Berger, "Quantifying the performance of garbage collection vs. explicit memory management." ACM SIGPLAN Notices. vol. 40. No. 10. ACM, 2005 (14 pages).
Johnson, Ryan, et al., "Shore-MT: a scalable storage manager for the multicore era." *Proceedings of the 12th International Confer-ence on Extending Database Technology: Advances in Database Technology.* ACM, 2009, pp. 24-35.
Oracle, "Using Oracle TimesTen Application-Tier Database Cache to Accelerate the Oracle Database," Oracle White Paper, Oct. 2014 (24 pages).
Oracle,"Guide to Database Performance and Tuning: Row Cache Enchancements, A feature of Oracle Rdb," Aug. 2003 (14 pages). [online] Available at: http://www.oracle.com/technetwork/products/rdb/0308-row-cache-712a-134300.pdf.
Robertz, Sven Gestegard, and Roger Henriksson, "Time-triggered garbage collection: robust and adaptive real-time GC scheduling for embedded systems." ACM SIGPLAN Notices. vol. 38. No. 7. ACM, 2003 (10 pages).
SAP, "Performance Scalability Enhancements in SAP Adaptive Server Enterprise: A Discussion on Scalability Enhancements in SAP ASE 16.0," 2014 (27 pages). [online] Available at: https://assets.cdn.sap.com/sapcom/docs/2015/08/1078f9b9-567c-0010-82c7-eda71af511fa.pdf#pdfjs.action=download.
SAP, "Release Bulletin for HP-UX," Sep. 3, 2015 (20 pages) [online] Available at: https://help.sap.com/doc/a61700aabc2b1014a7b69a11c72a0364/16.0.2.0/en-US/SAP_ASE_Release_Bulletin_HP_en.pdf.
SAP, *What's New in SAP ASE 16 SP02.* 2016 (38 pages) [online] Available at: https://www.sap.com/documents/2016/06/02a21e18-767c-0010-82c7-eda71af511fa.html.
Sikka, Vishal, et al., "Efficient transaction processing in SAP HANA database: the end of a column store myth." *Proceedings of the 2012 ACM SIGMOD International Conference on Management of Data.* ACM, 2012, pp. 731-741.
Stonebraker, Michael, et al., "The end of an architectural era:(it's time for a complete rewrite)." *Proceedings of the 33rd international conference on Very large data bases.* VLDB Endowment, 2007 (10 pages).

* cited by examiner

700

```
Function imrs_generate_vrid (Database d, Partition p, ProcessId pid):
    /* get in-memory page for this thread. */
    partition_vrid = get_in_memory_page(p, pid)

/* page is not yet created or full */
    if (partition_vrid->page_no == 0) {
        /*
        ** reserve next page number to use within database for this partition.
        ** Use Compare and Swap to replace last known page id with next
        ** page id. If compare and swap succeeds this partition gets next_page_id
        ** as page number for use in this partition.
        */
        do
        {
            last_page_id = d->last_generated_pageid
            next_page_id = last_page_id + 1;
        while (COMPARE_AND_SWAP(d->last_generated_pageid, last_page_id, next_page_id);
        partition_vrid = (next_page_id, 0);
    }

/* insert a row in page in partition vrid. */
    do
    {
        last_rid_used = partition_vrid;
        next_rid = last_rid_used;
        next_rid.row_num = last_rid_used.row_num + 1;
    } while (COMPARE_AND_SWAP(partition_vrid, last_rid_used, next_rid);

return next_rid;
}
```

1810
Determine, based on one or more accesses of data stored at a first location in a persistent memory page store, that the data is active 1820
Copy, in response to determining that the data is active, the data to a second location in an in-memory row store 1830
Index, in response to determining that the data is active, the data in an index table 1840
Access, based on the index table, the data at the second location in the in-memory row store to perform an update of the data

FIG. 18

IN-MEMORY ROW STORAGE ARCHITECTURE

FIELD

The subject matter disclosed herein relates to methods and apparatus for, among other things, an in-memory row storage architecture.

BACKGROUND

Online Transaction Processing (OLTP) Performance has been a key differentiating feature over the years for database management systems. In recent systems, the focus has been on providing "extreme" OLTP (xOLTP) performance, "extreme" scalability on multiple engine configurations, and so on. The demand for this level of performance is on the rise, going from sub-second, to sub-millisecond, and now microsecond performance. Recent advances in hardware technology, like fast multi-core processors supporting large amounts of memory (often in excess of 1 TB per box), have raised the bar on performance. Providing xOLTP performance on commodity hardware, equipped with multi-core computing architectures, at low total cost of ownership (TCO) has been important to database management system offerings in recent years.

Continuing this advancement in xOLTP capability, database management systems may be enhanced in new directions to leverage the high-end power available on modern multi-core platforms supporting large amounts of memory. Therefore, it may be desirable to provide systems and/or methods for faster database access/processing.

SUMMARY

In some aspects, a method, computer program product, and system are provided. The method, computer program product, and system execute operations for implementing and/or utilizing in-memory row storage architecture. For example, a system can include (or otherwise utilize) at least one processor and/or memory, which can be configured to perform operations including determining that data stored at a first location in a persistent memory page store is active, copying the data to a second location in an in-memory row store in response to determining that the data is active, indexing the data in an index table in response to determining that the data is active, accessing the data at the second location in the in-memory row store based on the index table, and performing an update of the data in the in-memory row store. Related systems, methods, and articles of manufacture are also described.

In some variations, the operations can further include providing the update of the data within the in-memory row store, wherein the update is not provided within the persistent page store. In some variations, the operations can further include generating new data based on a database query and/or inserting the new data into the in-memory row store, wherein the new data is not inserted into the persistent page store until the new data is determined to be inactive. In some aspects, the data comprises at least one row from a database table having a plurality of rows, wherein a first portion of the plurality of rows is stored in the in-memory row store, and wherein a second portion of the plurality of rows is stored in the persistent page store.

In some variations, the index table comprises indices for each row in the in-memory row store, and wherein each of the indices comprises an indication of an identifier for a physical page in the persistent page store, an indication of a row number in the physical page, an indication of an identifier for a virtual page in the in-memory row store, and an indication of a row number in the virtual page. In related variations, the operations can further include processing a database query requiring access to second data and/or determining a third location of a most recent version of the second data based on an index for the second data in the index table, wherein the third location is within the persistent page store or the in-memory row store, and wherein the index provides transparent access for the database query to the second data.

In some variations, the operations can further include processing a plurality of transactions comprising a plurality of database statements (e.g., insert, update, and/or delete statements), logging each transaction of the plurality of transactions that affect the in-memory row store within a transaction log in a persistent disk location when the transaction is committed, determining that a crash or a power down occurred, and/or recovering at least a portion of the in-memory row store after determining that the crash or the power down occurred based on accessing the transaction log.

In some variations, the operations can further include logging changes made by each statement (e.g., individually) of the plurality of database statements that affect the persistent page store within the transaction log when the statement is executed, applying changes made by each statement of the plurality of database statements that affect the in-memory row store to the in-memory row store by creating in-memory row versions when the statement is executed, determining whether the statement violates a trigger rule at the end of execution of each statement of the plurality of database statements, processing the trigger rule using the in-memory row versions to modify the in-memory row store when the statement violates the trigger rule, and/or processing the trigger rule using the transaction log to modify the persistent page store when the statement violates the trigger rule.

In some variations, the operations can further include determining that an available amount of space in the in-memory row store is insufficient, determining that second data in the in-memory row store is inactive, and/or migrating the second data from the in-memory row store to the persistent page store in response to determining that the available amount of space is too small, wherein the amount of space is insufficient when a current transaction cannot complete based on the available amount of space and/or when the available amount of space is less than a threshold. In some related variations, determining that the data is active comprises determining that the one or more accesses include the update to the data, and wherein determining that the second data is inactive comprises determining that the second data has not been accessed within a threshold period of time or determining that the second data is a least recently used row in the in-memory row store.

Implementations of the current subject matter can include, but are not limited to, systems and methods consistent with the present description, including one or more features as described, as well as articles that comprise a tangibly embodied machine-readable medium operable to cause one or more machines (e.g., computers and/or the like) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

BRIEF DESCRIPTION OF THE DRAWINGS

FIG. 7 illustrates an algorithm for VRID generation, in accordance with some implementations;

FIG. 18 illustrates an example of a method for maintaining an in-memory row storage architecture, in accordance with some example implementations.

Where practical, like labels are used to refer to the same or similar items in the figures.

DETAILED DESCRIPTION

As noted above, database management systems may be enhanced to leverage the high-end power available on modern multi-core platforms supporting large amounts of memory. At least some of the subject matter described herein relates to systems and methods for providing an in-memory row storage architecture.

Figure 1:
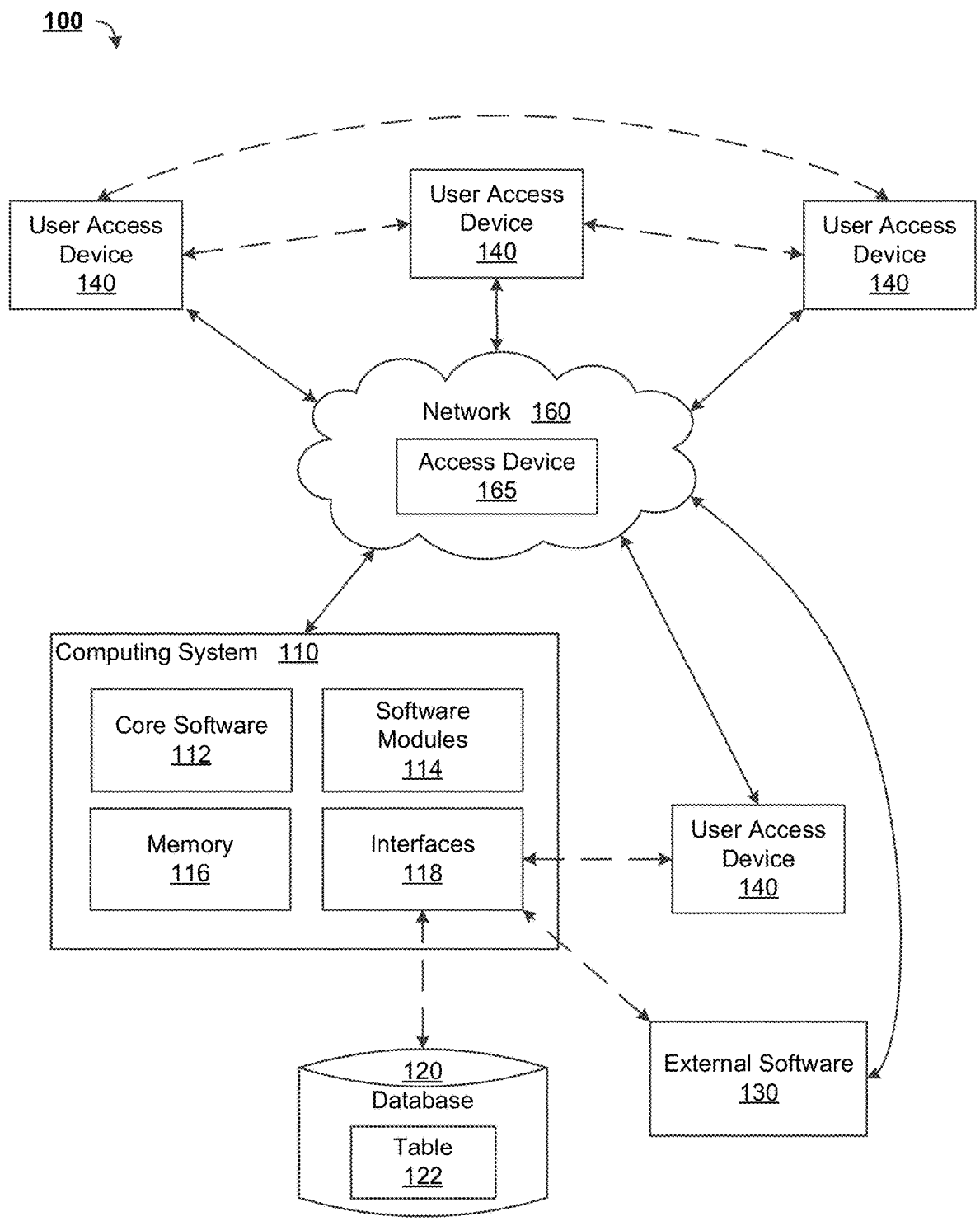
FIG. 1 illustrates a functional block diagram of a system in which features consistent with the described subject matter may be implemented.

FIG. 1 illustrates a functional block diagram of a system 100 in which features consistent with the described subject matter may be implemented. As illustrated, the system 100 can include a computing system 110 capable of communicating with one or more user access devices 140. In some aspects, the computing system 110 can utilize one or more interfaces 118 for communication. Communication among the devices of the system 100 can be through the use of direct communications, such as through the use of a wireless connection like Bluetooth, near-field communication (NFC), ZigBee, and/or the like, and/or a hard wire connection such as universal serial bus (USB). Communication can additionally or alternatively occur through indirect communications, such as over a network 160 (e.g., a local area network, a wide area network, a wireless network, the Internet, or the like).

Communication over the network 160 can utilize a network access device 165, such as a base station, a Node B, an evolved Node B (eNB), an access nodes (ANs), a hotspot, and/or the like. In some aspects, any of the user access device 140 can include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, and/or the like. Wired or wireless communication among the computing system 110 and user access devices 140 can occur according to various protocols and/or access technologies (e.g., Global System for Mobile Communication (GSM), Universal Mobile Telecommunications System (UMTS), technologies developed by IEEE such as Wi-Fi and/or Bluetooth, technologies developed by the Third Generation Partnership Project (3GPP) or 3GPP2 such as Long Term Evolution (LTE) and/or CDMA2000, and/or the like.).

As illustrated, the computing system 110 can include core software 112 and/or one or more software modules 114. The core software 112 can provide one or more features of a high-level programming software system. The software modules 114 can provide more specialized functionality. For example, the core software 112 and/or software modules 114 can include database management features, such as those described herein. In some aspects, the core software 112 or other similar software/hardware can be capable of accessing a database layer, such as the database 120, which includes at least one table 122, which can in turn include at least one column. The database table 122 can store any kind of data, potentially including but not limited to definitions of business scenarios, business processes, and one or more business configurations as well as transactional data, metadata, master data, and/or the like. relating to instances or definitions of the business scenarios, business processes, and one or more business configurations, and/or concrete instances of data objects and/or business objects that are relevant to a specific instance of a business scenario, business process, and/or the like.

In some aspects, one or more of the software modules 114 can be configured to utilize data stored in the memory 116, data stored in the database 120, and/or data otherwise accessible to the computing system 110. As further illustrated, the computing system 110 can be capable of utilizing external software 130. In some aspects, the external software 130 can provide additional functionalities or services which may not be available at the computing system 110. In some aspects, the external software 130 may include cloud services. In some aspects, the computing system 110 can aggregate or otherwise provide a gateway via which users can access functionality provided the external software 130. In some implementations, the database 120 and/or the external software 130 can be located across one or more servers, and/or communication among the computing system 110, the database, and/or the external software 130 can occur over the network 160.

At least a portion of the illustrated system 100 may include hardware and/or software that interacts with a database, users, and/or other software applications for defining, creating, and/or updating data, for receiving, handling, optimizing, and/or executing database queries, and/or for running software/applications (e.g., software modules 114, and/or external software 130) which utilize a database. In some aspects, the database 120 can be a structured, organized collection of data, such as schemas, tables, queries, reports, views, and/or the like, which may be processed for information. The database 120 may be physically stored in a hardware server or across a plurality of hardware servers. The database 120 may include a row store database (or a column store database) and/or the computing system 110 may be configured to perform OLTP (online transaction processing) and/or OLAP (online analytical processing), which can include complex analytics and tasks. Any of the data stored in the database 120 can additionally or alternatively be stored in the memory 116, which may be required in order to process the data.

In some aspects, the core software 112 can be configured to load the information from the database 120 to memory 116 (e.g., main memory) in response to some event and/or determination. For example, in some aspects, data may be retrieved from the database 120 and/or loaded into the memory 116 based on receipt of a query instantiated by a user or computer system, which can occur through one or more user access device 140, external software 130, and/or the like. In some implementations, at least a portion of the data for the database 120 can reside in-memory (e.g., in random-access memory (RAM)), within the memory 116, for example. In some aspects, data stored in-memory can be accessed faster than data stored in long term storage (also referred to herein as "on disk").

Although the database 120 can be illustrated as described as being separate from the computing system 110, in various implementations, at least a portion of the database 120 can be located within the memory 116 of the computing system 110. Procedures for handling how, when, and why data can be stored in-memory and/or on disk are described herein. The overall architecture of a system with data spanning both in-memory and on disk can be referred to as a storage architecture.

Figure 2:
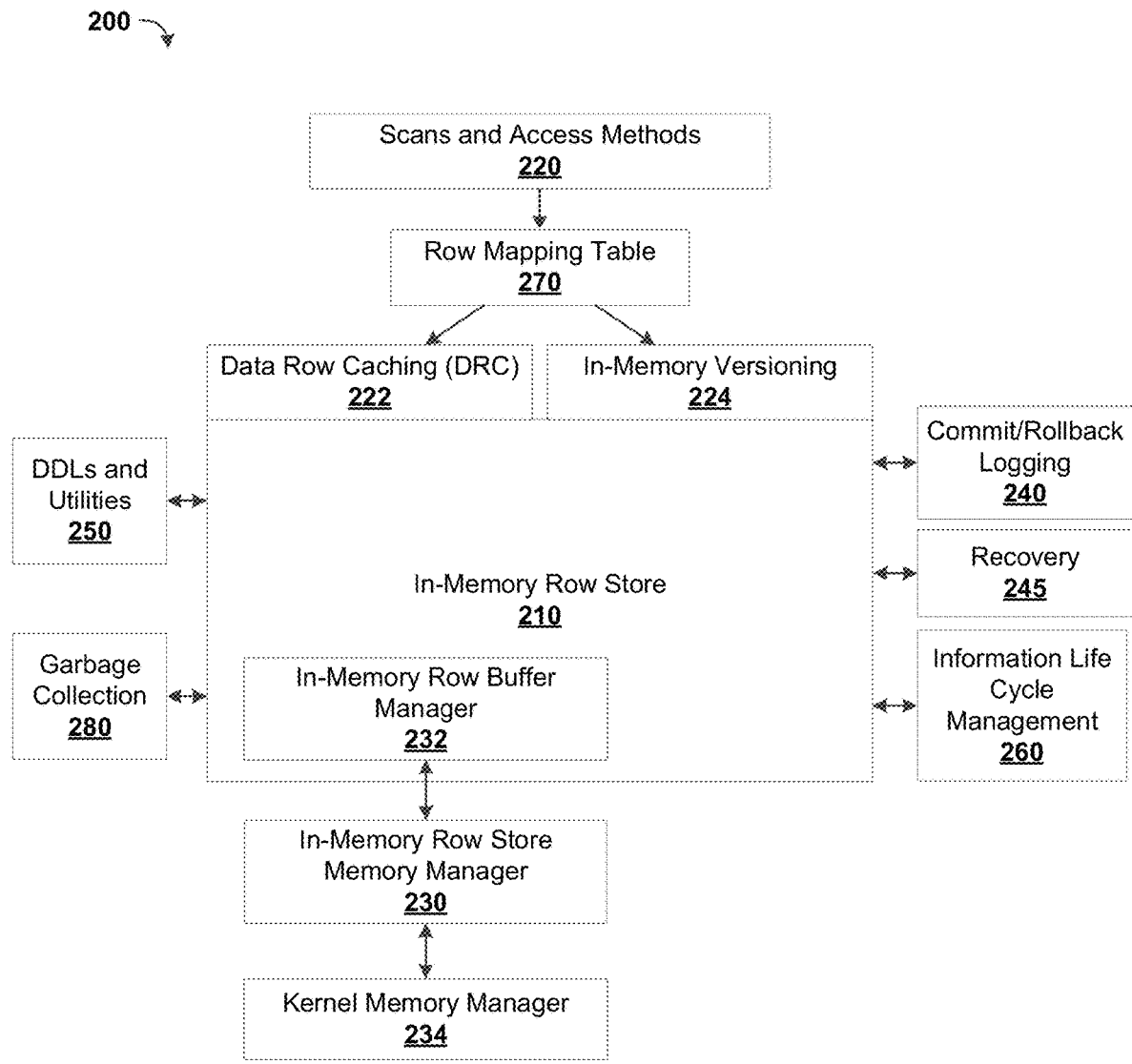
FIG. 2 illustrates components supporting at least a portion of a storage architecture (SA), in accordance with some example implementations.

FIG. 2 illustrates components supporting at least a portion of a storage architecture (SA) 200, in accordance with some example implementations. As illustrated, an in-memory row store (IMRS) 210 can be at the center of the SA 200 and/or many of the components of the SA 200 can communicate with the IMRS 210. As further illustrated, the SA 200 can include scans and access methods 220, a row mapping table 270, data row caching (DRC) 222, in-memory versioning 224, an in-memory row buffer manager 232, an IMRS memory manager 230, a kernel memory manager 234, commit/rollback logging 240, recovery 245, information life cycle management (ILM) 260, data description language (DDL) structures and utilities 250, and/or garbage collection 280. One or more of the components of the SA 200 can be implemented via software and/or hardware, such as through physical storage device(s), processor circuit(s), and/or programming language instructions. In some aspects, the SA 200 can be regarded as a level-2 overall architecture. In some aspects, the SA 200 can be configured for delivering OLTP/xOLTP performance.

Important functionalities supported by the SA 200 can include (1) an in-memory row store and/or access layers (e.g., Data Row Caching) tightly integrated with other database management system components; (2) a singular product offering enhancements (e.g., to minimize the adoption hurdles when existing Enterprise resource planning (ERP) and/or Financial Services industry (FSI) customers evaluate new database management system offerings to upgrade to from their current installations); (3) simple upgrade paths for existing installations and/or users; (4) technologies to enhance OLTP performance without destabilizing existing sub-systems, which can continue to execute for legacy (e.g., non-xOLTP) applications; (5) continued support for relevant and/or frequently used existing features of database management systems in conjunction with the IMRS; and/or (6) incremental rollout of additional xOLTP performance enhancements to various database management sub-systems.

Definitions can be provided for functionality supported by the SA 200, which can aid in delivering xOLTP performance on data-rows-locked tables in an symmetric multiprocessing (SMP) installation, for example. Tight integration of new technologies and/or functionalities with existing database management system capabilities can provide an important differentiating feature. Along with enhanced performance, application compatibility with current features, ease of migration to a new architecture, and/or seamless transition at run-time to the new capabilities are some potential advantages of the SA 200. These advantages can provide high performance for large classes of business suite (BS) applications in a variety of industry verticals utilizing database management systems as the underlying database engine, and/or for transactional workloads in markets in which certain database management systems are dominant.

References to the SA 200 herein can refer to the entire architecture or some portion thereof. For example, functionality described with respect to the SA 200 can be implemented using one more of the illustrated components of the SA 200, one or more components which are not explicitly illustrated, some combination thereof, and/or the like.

In some implementations, transactionally active data can be memory-resident (e.g., stored in-memory) and/or a database engine can provide enhanced performance for electronic transactions operating on the transactionally active data. In some aspects, transactionally active data can include data which is accessed a certain number of times, accessed according to a certain frequency, of a certain type, for critical transactions, and/or the like, and may also be referred to herein as "hot" data. The IMRS 210 can provide a row-oriented caching layer, outside of long term storage/persistence, to host hot data and/or deliver enhanced performance for transactions operating on such hosted data.

Figure 3:
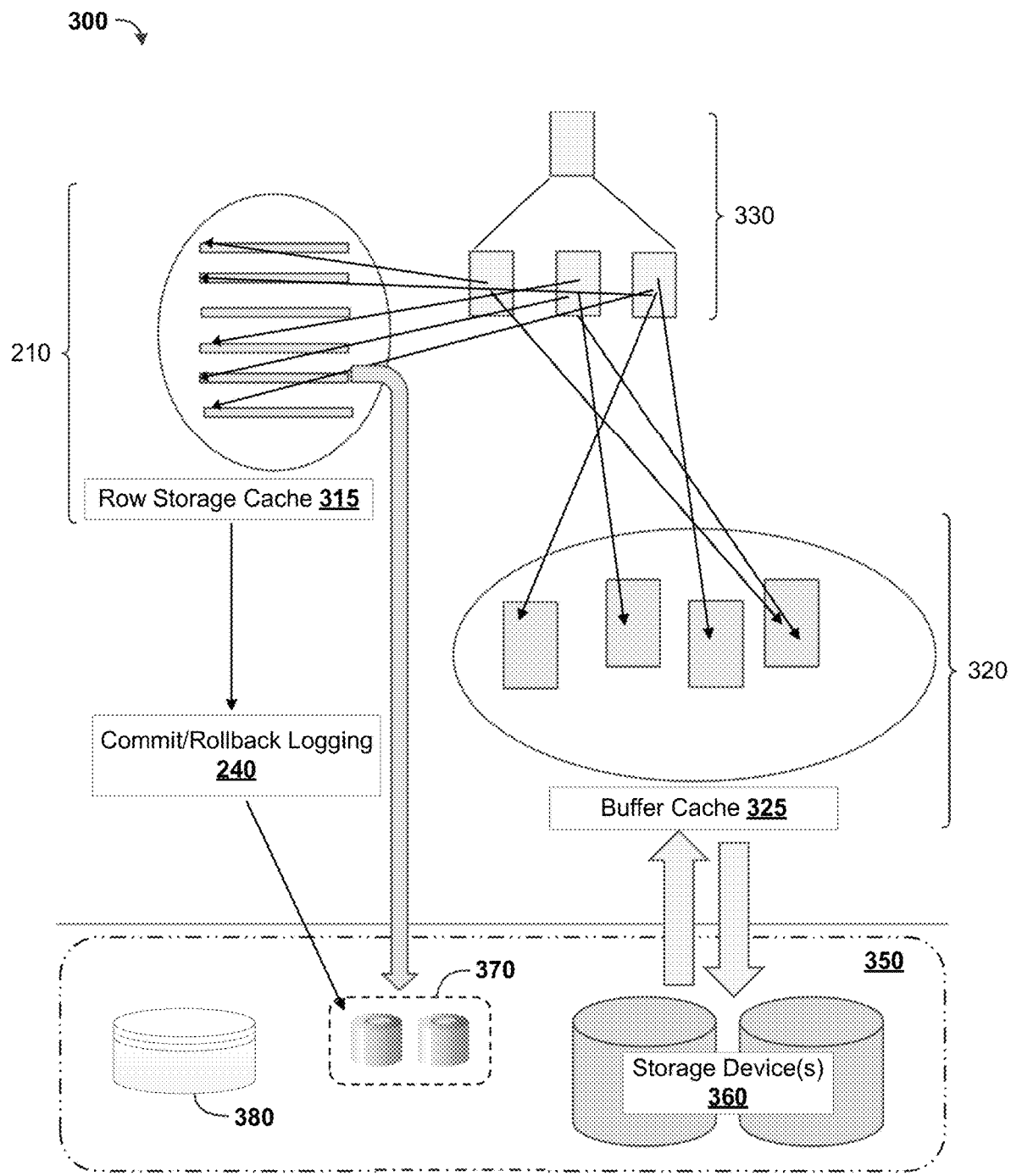
FIG. 3 illustrates a system including components supporting an IMRS, in accordance with some example implementations.

FIG. 3 illustrates a system 300 including components supporting an IMRS 210, in accordance with some example implementations. In some aspects, the system 300 can be similar to the SA 200 of FIG. 2. As illustrated, the system 300 can include the IMRS 210, a row storage cache 315, a page-based storage 320, a buffer cache 325, an index 330, and additional memory 350.

The page-based storage 320 can include page-based, disk-resident storage for data (e.g., data rows and/or index rows), which may be loaded in and/or out of one or more buffer caches 325. However, in some aspects, the page-based storage 320 can include other information and/or be stored according to another format. The index 330 can include a B-tree index and/or multiple levels. The additional memory 350 can include one or more storage device 360 (e.g., hard disk), an IMRS log 370, and/or a system log 380. Commit/rollback logging 240 can leverage the IMRS log 370 in the event the system 300 (or some component thereof) crashes, is turned off, is reset, and/or the like.

As illustrated, the index 330 can span the IMRS 210 and the page-based storage 320. When data (e.g., a row) is required for operation, the index 330 can locate the data regardless of whether the data is located in the IMRS 210 and/or the page-based storage 320. As further illustrated, the index can include multiple levels.

The rows hosted in the IMRS 210 can be accessed (e.g., using a SELECT operation) and/or modified (e.g., using an UPDATE and/or DELETE operation) at various isolation levels (e.g., level-0, level-1, level-2, level-3, and/or the like). The IMRS 210 can provide a data store layer, providing access to the rows at the desired isolation level and/or at the right interface/coupling needed by a query processing layer. The IMRS 210 can also be referred to as the row storage cache 315 and/or including the row storage cache 315.

In some implementations, a tightly-integrated IMRS 210 can be added to database management systems and/or provide full indexing support for data that is resident in the IMRS 210. The IMRS 210 can provide the backbone for performance-oriented features for database management systems. For example, storage models can be designed to reflect a data life cycle intrinsic to certain kinds of transaction workloads, so that performance commensurate with the data life cycle can be delivered through storing rows in-memory and/or on a disk-based page store. Fully durable, ACID (Atomicity, Consistency, Isolation, Durability) compliance can be provided to the data resident in the IMRS 210. Full archive management can be provided through a backup server supporting operations of a database containing data resident in the IMRS 210.

Figure 4:
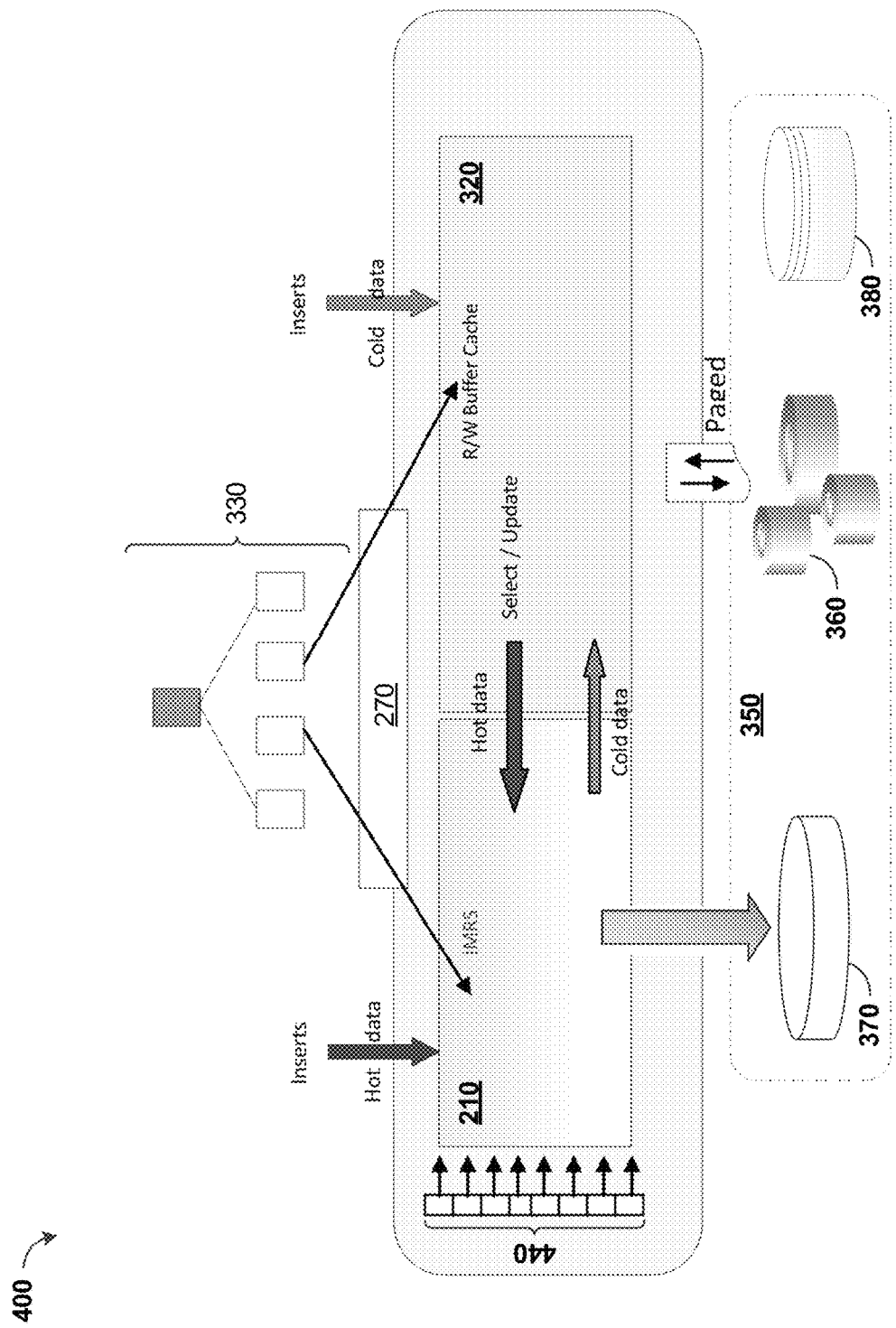
FIG. 4 illustrates another system including components supporting an IMRS, in accordance with some example implementations.

FIG. 4 illustrates another system 400 including components supporting an IMRS 210, in accordance with some example implementations. In some aspects, the system 400 can be similar to the system 300 of FIG. 3.

In some aspects, the IMRS 210 can be configured to host different types of rows, such as inserted rows, migrated rows, cached rows, other row types, and/or the like. Inserted rows can be rows that are newly inserted to an IMRS-enabled table, which can go directly to the IMRS 210 without a page-resident image of the row in the page-based storage 320. Future updates to such rows can continue in the IMRS 210, but the row may still be referred as an inserted row. Migrated rows can include rows that reside in the page-based storage 320 but are subsequently migrated to the IMRS 210. If rows are migrated, for updates or deletes or the migrated rows the contents of the row in the IMRS 210 can be the latest version and/or the version of the row in the page-based storage 320 may be stale. Cached rows can refer to rows that reside in the page-based storage 320 but are frequently accessed, and hence can be cached within the IMRS 210 (e.g., without changes to their contents). The contents of the cached rows in the IMRS 210 and their original image in the page-based storage 320 can be identical.

The IMRS 210 may be configured to host all rows of a new or existing table entirely in-memory. This can lead to an in-memory "hot" table. Similarly, if individual partitions are enabled to use the IMRS 210 and/or sufficient memory is provided by the system 400 for the IMRS 210, then all rows of a partition may be memory-resident. This can lead to a "hot" partition storage model. For truly hot tables and/or partitions, with appropriate memory configuration hooks and/or DDL support the portion of the table and/or partition in the page-based storage 320 may be empty. This can lead to potential access optimizations. For VLDB (Very Large Database) tables, the IMRS 210 may hold only some of the most active rows from a table and/or partition. The rest of the less active rows can continue to be stored in the page-based storage 320 and/or be accessed by page-based and/or buffer cache methods. This usage of the IMRS 210 can be referred to as a "hot data" model, where the tables' and/or partitions' data can be partially in the IMRS 210 and partially in the page-based storage 320. In some aspects, a partition can be regarded as an organizational database structure having multiple tables.

Some database management system architectures can follow a page-based disk-resident storage model with a buffer cache providing the in-memory storage for page-based data. However, this model can suffer from some performance issues, such as latching overheads for data and/or index pages, locking overheads, length of code-path issues, run-time logging overheads, others issues in the area of concurrency and/or blocking between concurrent readers and/or updaters of data, and/or the like. The IMRS 210, on the other hand, can provide for delivery of enhanced performance for transactions operating on hot data, of storage models that intrinsically reflect the information life cycle of transactional data, and/or the like.

The IMRS 210 can be defined to support "hot tables" and/or "hot data." Hot tables can include a database table that is entirely memory-resident, being frequently scanned, and/or being frequently updated. Hot data can include portions of a database table that are transactionally active, where remaining data from the database table is memory-resident. In some implementations, transactional data can be regarded as "hot" (e.g., frequently accessed and/or modified), "warm" (e.g., occasionally accessed and/or updated), and/or "cold" (e.g., infrequently accessed and/or rarely updated). In some aspects, transactional data can be broadly classified as active or passive data. Defining an architecture that can provide enhanced performance for transactions operating on hot data can be desirable. Similarly, providing storage and/or access models that reflect the usage pattern of data based on their access patterns can be beneficial.

Providing an expected usage model for transactional data can involve creating and/or inserting a data record(s) into a database and accessing and/or modifying the data record(s) for some period of time/activity following the creation and/or insertion. Once a transaction "completes" (e.g., once data records are updated), previously active data rows tend to be less frequently accessed and/or updated, thereby becoming passive data. Occasionally (e.g., periodically), passive data may be re-activated by regularly occurring events (e.g., end of quarter accounting, end of year accounting, targeted sales promotions, and/or the like), at which time data may become active again. However, over time, passive data often becomes inactive, at which time a less-efficient storage and/or access mechanism can be preferred for such data.

In some aspects, insert, select, update, and/or delete operations (ISUDs) on transactionally hot data can be driven by fully-qualified index access. In some aspects, tables can be required to have at least one index, which might not be required to be unique. However, tables in the schema of an OLTP system can be expected to have a primary key index and/or one or more unique indices. Secondary indices can also be defined on such tables. Access of an entire table (e.g., table scans) can be expected to either not occur or rarely occur in a workload. Updates can typically change non-index key columns, and/or the index key columns of primary or unique indices may rarely, if ever, be updated. Operational activities such as building indices and/or defragmenting tables may not occur on active data and/or can be scheduled to occur during off-hours of activity.

In-Memory Row Store 210

The IMRS 210 can provide a high-performance, in-memory row store for active data. Data that is transactionally active can reside in the IMRS 210, which can be enabled as a per-partition storage repository for hot data (e.g., hot tables or hot partitions) and/or can be an extension of the page-based storage 320. The IMRS 210 can be both a store and a cache in that it can provide a memory-based storage repository for active data rows which are frequently updated. The IMRS 210 can also provide a repository for caching active rows that are frequently selected, which can act as an efficient cache for hot rows between a buffer cache 325 and user queries. Additionally or alternatively, a query-processing-friendly row format (QPFRF) can be created for frequently selected rows to act as another "row-caching" layer on top of the IMRS 210 data row to accelerate performance (e.g., when performing a select operation).

A QPFRF can include an internal layout of frequently selected rows in the IMRS 210, oriented in a manner such that the column values can be accessed directly from values in the IMRS 210 rows and/or without requiring further alignment or data copying to query processing structures. This format of the IMRS 210 data row can be generated based upon access criteria such as frequency of access. A QPFRF row can be manufactured for frequently scanned rows from the IMRS 210 that are mostly only read (e.g., as opposed to mostly written).

Figure 5:
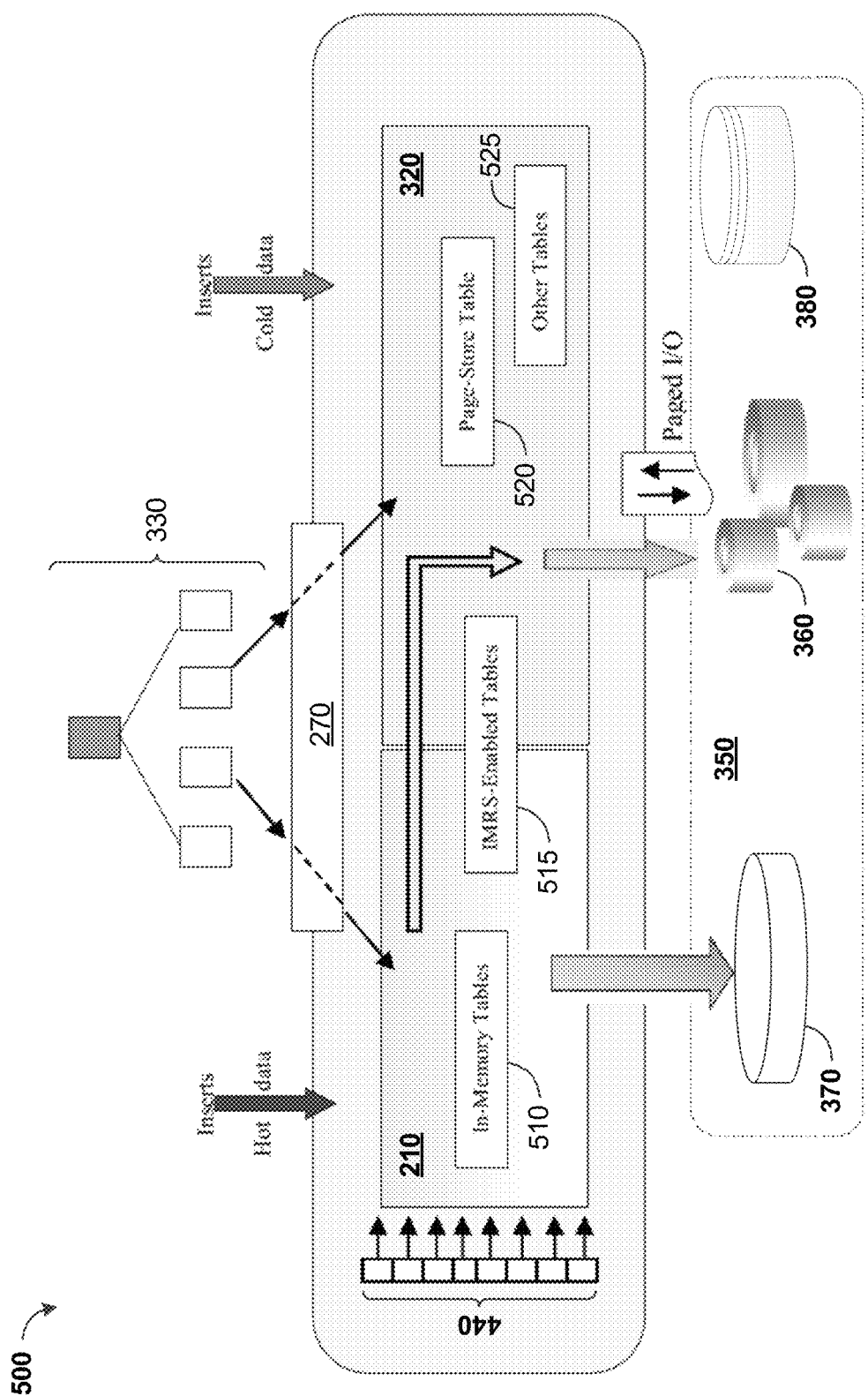
FIG. 5 illustrates another system including components supporting an IMRS, in accordance with some example implementations.

FIG. 5 illustrates another system 500 including components supporting an IMRS 210, in accordance with some example implementations. In some aspects, the system 500 can be similar to the system 400 of FIG. 4.

In some aspects, not all tables are expected to be memory-resident. For example in some implementations, only a small number of hot tables in an OLTP schema may be expected to completely leverage the IMRS 210 model, which may be referred to as in-memory tables 510. Tables that are defined or altered to use the IMRS 210 can be referred to herein as IMRS-enabled tables 515. In some aspects, IMRS-enabled tables 515 can be configured for use within both of the IMRS 210 and the page-based storage 320. DDLs and utilities 250 (e.g., DDL functions and/or extensions) can be provided to define new tables as being IMRS-enabled and/or to alter existing tables to leverage the IMRS 210. Tables which reside fully on the page-based storage 320 can be referred to as page store tables 520. Other tables 525 may also exist.

Data residing in the page-based storage 320 can be read into a buffer cache 325, which can provide the input and output (I/O) channel for reading and/or writing pages from and/or to disk (e.g., within a storage device 360). The IMRS 210 can provide an in-memory storage layer where frequently accessed data rows can exist in an uncompressed format and/or in a layout that can provide for efficient access and/or manipulation by a query processing execution engine.

In some implementations, new data may be initially inserted into only the IMRS 210 (e.g., in-memory), remain in the IMRS 210, and/or be accessed and/or updated directly in the IMRS 210. In some aspects, a table including such newly inserted data can include a union of rows found (if at all) in the page-based storage 320 (some of which may have been buffered in the buffer cache 325) and rows in the IMRS 210.

Database tables can have a primary key index and/or some other unique index. The rows for a given table in the IMRS 210 can be stored in per-partition based structures so that partition-specific scanning can be supported when needed. In some aspects, different forms of indices, unique and non-unique indices, local and global indices, and/or the like can be allowed on multi-column composite keys.

The IMRS 210 can provide a repository for older versions of rows that are updated, such as when versioned rows are chained in reverse chronological order of the update sequence. Rows that exist on the page-based storage 320 when they are updated can result in a new row being inserted into the IMRS 210, with the page-based row becoming the prior version for the updated row in the IMRS 210.

A disk-resident fully durable database (DRDB) enabled for IMRS 210 usage can include a database supporting all of the ACID properties and/or providing full support for load database operation and/or load transaction operation functionality. A DRDB enabled for IMRS 210 can differ from other in-memory database offerings where the entire database is fully in-memory, as an IMRS-enabled database may only require and/or utilize a portion of the database in-memory. For a VLDB installation, due to constraints on available memory and costs thereof, an IMRS-enabled database can be more practical (e.g., than a fully memory-resident database) to achieve the required OLTP performance. An IMRS-enabled database can include a disk-resident database enabled for IMRS 210 usage by provisioning a row storage cache.

Row Storage Caches 315

To support IMRS 210 functionality, database management systems can be enhanced to support row-oriented caching, referred to herein as a row storage cache 315. In some aspects, the row storage cache 315 can be similar to a page-based buffer cache 325. Memory can be allocated to a cache of a new row storage type and/or memory can be allocated for row-buffers. In some implementations, management of row storage caches 315 can be through cache configuration interfaces, wherein the cache memory can be divided, allocated, and/or freed (e.g., in terms of data row sizes and/or plus any overhead). As the same row storage cache 315 can be shared for data rows from multiple tables with widely varying schemas, allocation and/or freeing patterns can be non-deterministic at run-time. Some base requirements of the row storage cache 315 can be determined and/or inferred based on the schema of tables bound to the row storage cache 315. However, in some implementations, due to presence of variable-length columns and/or in-row large object (LOB) columns (which can be memory-resident), expanding updates, shrinking updates, rollbacks, and/or in-memory versioning for updates, the footprint of memory allocation and/or freeing at run-time can vary depending on the workload and/or data row access patterns.

High-performance row storage caches 315 can be supported by enhancements to the Kernel memory manager 234, providing low-latency, non-blocking, and/or minimal blocking concurrent access to cache memory. An intermediate layer, such as the IMRS memory manager 230, can collaborate (e.g., communicate and/or interface) with the kernel memory manager 234 providing memory management services at the kernel level (keeping the schema and row-usage patterns in perspective) to provide information to the in-memory row-buffer manager 232, which can be optimal/efficient (e.g., in terms of memory usage and/or fragmentation).

Data Row Caching 222

DRC 222 can be a feature built on top of the IMRS 210 to deliver improved performance while scanning and/or updating frequently accessed rows from data-rows-locked tables. Individual tables in a database setup for IMRS 210 usage can be selectively enabled to use DRC 222. DRC 222 can leverage access patterns to data rows and/or attempts to access (e.g., via selects and/or data manipulation language (DML) operations, such as retrieve, store, modify, delete, insert, update, and/or the like) rows directly in the IMRS 210, rather than in the page-based storage 320. Enabling DRC 222 for hot tables can deliver improved performance, especially for high-volume OLTP workloads.

DRC 222 can leverage the capabilities of the IMRS 210 to host data from frequently accessed/modified rows ("hot" rows) in the IMRS 210. Newly inserted rows to an IMRS-enabled table can be inserted first and/or only into the IMRS 210. Subsequent access to those rows for selects or modifications can be provided directly from the IMRS 210. This can be one form of DRC 222 usage of the IMRS 210. Another form of DRC 222 usage can be when existing rows in the page-based storage 320 are updated and/or scanned repeatedly. Another form of DRC 222 usage can be when all/most of the rows in a table are frequently updated (e.g., the available inventory in a warehouse consisting of a reasonably small product list). Such rows/tables can be migrated from the page-based storage 320, hosted in the IMRS 210, and/or subsequent access/modifications to those rows can continue in the IMRS 210.

In some aspects, when DRC 222 is enabled for a table, new inserts can be first inserted to the IMRS 210 without allocating any space in the page-based storage 320. Subsequent updates to such rows can be performed in the IMRS 210. If such rows are then subsequently deleted, the row can be deleted directly from the IMRS 210 without requiring access to the page-based storage 320.

Frequent updates to rows residing in the page-based storage 320 may result in the row being migrated to the IMRS 210. Subsequent updates may then performed to the in-memory version of the row, which can be in an uncompressed format. In some implementations, no data page or buffer access results while updating the row in the IMRS 210. Depending on the access pattern to hot data, some frequently accessed rows may be cached in the IMRS 210 in an uncompressed format. Subsequently, scans to such rows may be performed directly from the IMRS 210, without accessing the data page or data buffers.

Rows residing in the IMRS 210, whether for newly inserted rows or migrated rows, can be accessible via the index 330. Over time, when access to rows in the IMRS 210 decreases, a background task can harvest old and/or cold data rows, move them back to the page-based storage 320, and/or release memory used by such rows back to the AIRS 210. Rows that were newly inserted to the IMRS 210 can be moved to newly allocated pages, whereas existing rows that were migrated to the AIRS 210 from the page-based storage 320 can be migrated back to their original location (e.g., a specific row) on the page-based storage 320.

DRC 222, as a user-visible feature, can be designed to model the storage and access techniques around the data life cycle. Hot data can be preferentially migrated to the IMRS 210, operated in-memory, and/or as data ages-out, transparently moved back to the page-based storage 320 and/or buffer cache 325.

Row Identity (RID) Mapping Table 270

Figure 6:
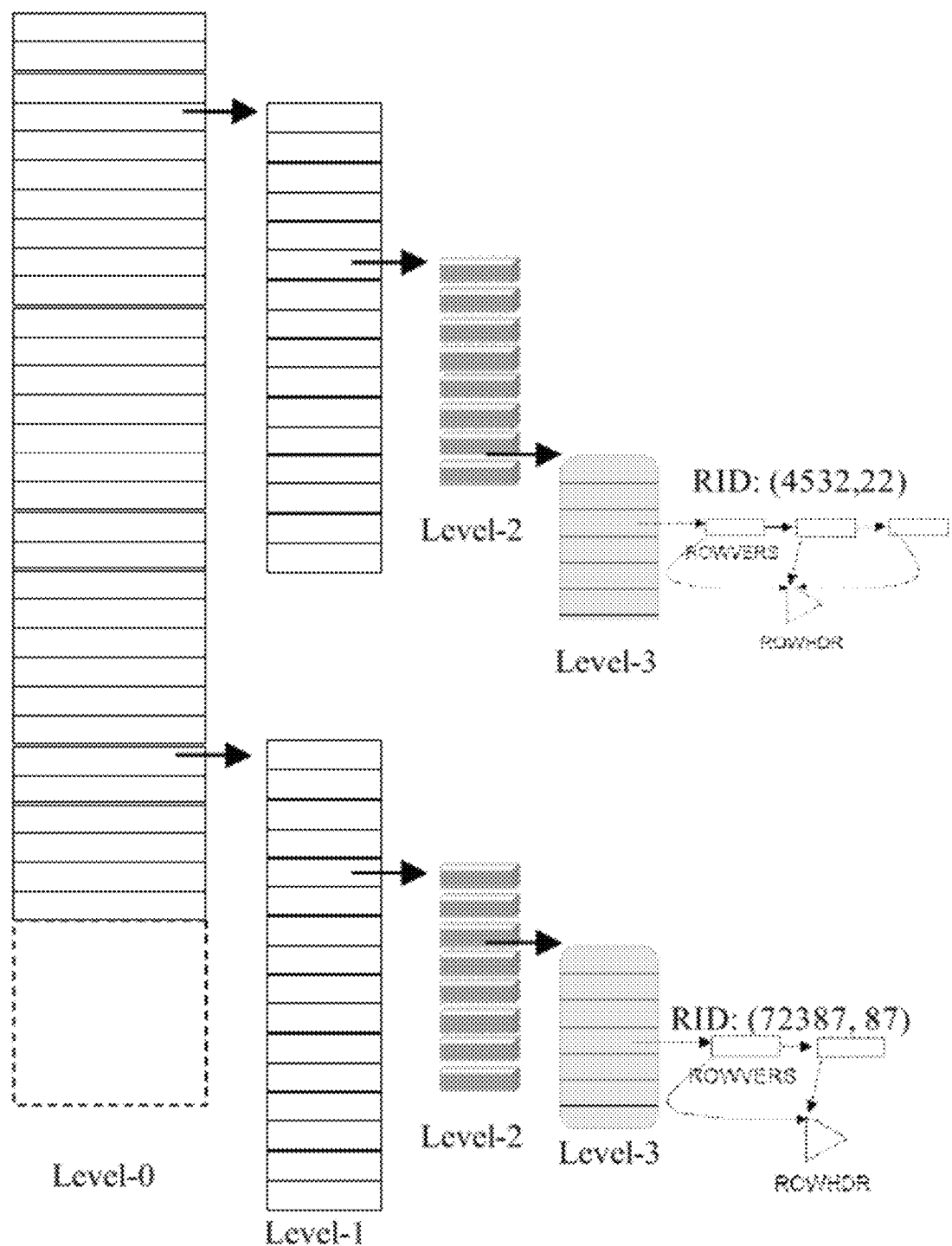
FIG. 6 illustrates a possible layout of the RID mapping table, in accordance with some implementations.

The RID mapping table 270 can include a table that supports index and/or table scans within the SA 200. FIG. 6 illustrates a possible layout of the RID mapping table 270, in accordance with some implementations. The RID mapping table 270 can include a database-wide mapping table having multi-level series of contiguous arrays, mapping a RID (page-ID, row #) to a memory address. Each level of the RID mapping table 270 can map to contiguous chunks of pages in a database's space map. As the IMRS 210 can be designed to hold hot/active rows, only a percentage of existing rows from the page-based storage 320 may be in the RID mapping table 270. In some aspects, the RID mapping table 270 can blossom out to allocate and/or fill out sub-arrays at each level, holding pointers to sub-arrays at the next level (e.g., sub-arrays at level-1 can include pointers to sub-arrays at level-2). Over time, as rows are removed from the IMRS 210, the RID mapping table 270 can shrink to maintain sparseness. For rows that are not in-memory, a probe may return early due to the sparse nature of the sub-levels. The RID mapping table 270 can be managed using efficient, lockless lookups and/or CAS-based updates to grow and/or shrink the memory at different levels.

In some aspects, cached rows stored within the IMRS 210 can initially include read-only rows, but may eventually be updated in-memory. In various implementations, only the in-memory version of the cached row may be updated, whereas the page-based storage 320 image may remain stale. Scan and access methods 220 can be configured to utilize this dichotomy and/or return the latest image of the cached-updated-row from the IMRS 210, using a lookup of the RID mapping table 270.

Row Storage Caches 315

In some aspects, there can be an inherent dependency on the use of DRC 222, as individual features may depend on the existence of a row storage cache 315 being available. In some implementations, only one database-wide row storage cache 315 may be provided, but a per-table row storage cache 315 can additionally or alternatively be provided. In some aspects, a DRC-enabled table can inherit the database's row storage cache 315.

Table 1 shows the behavior of ISUDs for DRC-enabled tables, in accordance with some implementations. In some aspects, for the deletion of rows migrated to the IMRS 210, the page-based storage 320 version of the row can be deleted (and space reclaimed) as a result of a purge operation. In some aspects, the purge operation can be performed (at least in part) via garbage collection 280, as described herein.

TABLE 1

| Operation | Feature |
| --- | --- |
| Insert | Goes to the IMRS 210 first. Subsequent updates or deletes to rows existing in the IMRS 210 are performed directly in the IMRS 210 without affecting the page-based storage 320. |
| Select | Hot rows that are frequently scanned may be brought to IMRS 210 for row caching (performance benefits). Subsequent selects of these rows return the values directly from the IMRS 210. |
| Update | Occasional updates to some rows that reside on the page-based storage 320 are performed directly on the page-based storage 320. Frequently updated rows may be brought to the IMRS 210, for performance gains for future accesses (e.g., selects and/or updates). Thereafter, updates to such rows are performed in the IMRS 210, without affecting the data page itself |
| Delete | Performed on the page-based storage 320 when the row is first deleted directly from the page-based storage 320. For delete of a frequently scanned or updated row that was migrated to the IMRS 210, the delete is performed in the IMRS 210 and also from the data page. |

Updates

Updates to rows that are on the page-based storage 320 can continue to be performed on the page-based storage 320. For DRC-enabled tables, run-time heuristics can be applied to identify rows in the page-based storage 320 that are frequently updated and/or relocate the identified rows to the IMRS 210, for improved performance of future selects or updates of such rows. This process can be referred to as row migration. Rows that come into the IMRS 210 due to row migration can be referred to as migrated rows.

In some aspects, as described herein, operations may be logged in the IMRS log 370 for recovery, in the event of system failure, shutdown, restart, and/or the like. Row migration can be a non-logged operation in the IMRS log 370. In anticipation that migrated rows may be re-accessed, rollback of the transaction that caused the row migration can roll back the update itself. However, the migrated row itself may be left in the IMRS 210 as a cached row, in preparation for an immediate access. In other words, the update event itself may be a combination of an unlogged row-caching event, followed by a logged update event. The end result of the row's status in the IMRS 210 can be implementation-defined, subject to available memory and/or other design considerations.

In some aspects, row migration can be performed without updates of indices pointing to the migrated row. The migrated row's RID may not change and/or index scans can be redirected to access the row from the IMRS 210 by looking the migrated row up in the RID-mapping table 270 (e.g., via the scans and access methods 220).

Updates to rows that are in the IMRS 210 (e.g., inserted, cached, and/or migrated rows) can be performed directly in the IMRS 210 without affecting their home-row location (if any) on the page-based storage 320 for migrated and cached rows.

In some aspects, updates of rows in the IMRS 210 can produce new row images for each update, which can consume memory while the transaction is active. Accordingly, the memory for intermediate row versions can be reclaimed, sometime after the transaction completes, via garbage collection 280. A very large transaction performing thousands of updates to the same row could consume memory excessively for intermediate row versions. However, this situation can be mitigated by the availability of garbage collection 280, which can potentially reclaim memory from intermediate versions. The extent to and/or rate at which garbage collection 280 reclaims memory for intermediate versions (e.g., produced by an in-flight transaction) can be determined during implementation and/or at runtime.

In some aspects, the latest version of a row can be in the IMRS 210 and/or the original version in the page-based storage 320 can become stale. Index access to such rows in the IMRS 210 can find the latest version of the row in the IMRS 210. For example, table scans accessing rows from the page-based storage 320 can be configured to return the latest version from the IMRS 210 (e.g., if the row was previously migrated to the IMRS 210).

When the update frequency of a row decreases and/or due to other considerations such as reduced memory available in the IMRS 210, some of the updated rows may be "packed" back to the page-based storage 320 and/or deleted from the IMRS 210, as described herein.

Deletes

Deletes of rows that already reside in the page-based storage 320 can be performed using logged updates on the page-based storage 320. Deletes of inserted rows can be performed as a logged delete in the IMRS log 370. Memory used by the row and/or its intermediate versions can be available for reclamation via garbage collection 280, which can be done after the transaction completes.

Deletes of cached rows can be performed as a logged delete in the page-based storage 320, with logging in the system log 380. The footprint of the cached row in the IMRS 210 can be erased and/or the memory used by the row can be made available for reclamation via garbage collection 280, without resorting to any logging in the IMRS log 370. The system log 380 logging can be performed in-line with the transactional activity using a PLC (Private Log Cache). Memory reclamation can be deferred to after the transaction completes so that run-time transactional performance can be unimpeded (at least in part). If a deleting transaction rolls back, the IMRS 210 version of the row may be safely re-instated without need for further memory allocation or initialization. In some implementations, the cached version of the row can be reinstated following a rollback.

For migrated rows, the IMRS 210 component of the row can be deleted similar to inserted rows. Memory for all versions of the row can be made available to the garbage collection 280 thread for reclamation, which may occur after the transaction completes. In addition, as the migrated row has a counter-part page-resident row-image, the deletion of the row from the page-based storage 320 can be performed as a fully logged operation in the system log 380. In some implementations, logging for the deletion for the page-based storage 320 version of the row can be done in-line with the transactional activity, whereas the logging for the IMRS 210 version can be performed as a commit-time logging operation in the IMRS log 370. In case of a rollback, the page-image version of the row can be restored to its pre-updated image. The final version of the deleted row can be re-instated in the IMRS 210 without an additional memory allocation operation.

Whether the footprint of an IMRS 210 row, such as in the RID-mapping table 270, is erased immediately as part of the commit of a delete or sometime after the transaction completes via garbage collection 280, can be implementation-specific.

Merge

A merge statement can include a two-part statement updating existing rows which qualify and, if not, inserting new rows. It is possible that, for a single merge statement, some rows may be inserted in the IMRS 210 and some other rows may be updated both in the IMRS 210 and the page-based storage 320. If some row-usage threshold(s) are met, some updates under a single merge statement could cause row migration. Logging and/or rollback semantics of the merge statement can be similar to those of the individual insert and/or update components.

Virtual RID (VRID) Generation

In some database systems, each row inserted can have an associated RID (e.g., used to locate a physical memory location for the rows). In some implementations, an RID can include a page identifier and/or row number. For the page-based storage 320, an RID can be generated based on the page in which the row is inserted and/or a row number within that page. However, rows inserted into the IMRS 210 may not have a page-based storage 320 footprint. Thus, an RID may need to be generated for inserted rows. In some aspects, this RID can be referred to as a VRID. A VRID can similarly include a page identifier and/or a row number. However, the page identified by the VRID may be a "virtual" page in the IMRS 210, which can simply include a container for rows and/or might not include metadata, such as metadata associated with page-based storage 320 pages.

To support fast and/or concurrent inserts in-memory, a VRID generation algorithm can use concurrent lockless data structures. For hot partitions with many inserts, a single page per partition could lead to hot spots. Accordingly, the SA 200 can create and/or maintain multiple in-memory pages for inserted rows. In some implementations, each process/connection can select one or more different pages, based on a page identifier. Having the connections select different pages can allow for processing of concurrent inserts, on the same partition by multiple threads, without creating contention for generating VRIDs. If there are a large number of processes/connections, each page of a partition may have a small number of inserted rows. In some implementations, each in-memory page may be designated to store inserted rows from an individual partition. However, there may be no requirement that consecutive pages belong to the same partition(s) (or other object).

FIG. 7 illustrates an algorithm 700 for VRID generation, in accordance with some implementations. The illustrated compare and swap function can be used as a lightweight, lockless synchronization mechanism to generate new page identifiers and/or new row numbers within the same page.

Low or Out-of-Memory in IMRS 210

The SA 200 can be configured to handle low memory and/or out-of-memory conditions (e.g., error states) for IMRS 210 (e.g., for the row storage cache 315) transparently and allow operations (e.g., DML operations) to continue on the page-based storage 320. For example, in some implementations, the SA 200 can prevent new migrations and/or inserts of rows into the IMRS 210 when the IMRS 210 is low and/or out of memory. In order to prevent new migrations and/or inserts, the SA 200 can track a percentage usage of the IMRS 210 and/or the row storage cache 315. For example, if the percentage of utilization increases beyond a threshold (e.g., 70%, 75%, 80%, 85%, 90%, 92.5%, 95%, 100%, and/or the like), then the SA 200 can prevent new rows from being inserted and/or migrated to the IMRS 210, at least until the percentage utilization is decreased to another threshold (e.g., 65%, 70%, 75%, 80%, 85%, 90%, 92.5%, 95%, and/or the like).

In some implementations, the SA 200 can handle low memory and/or out-of-memory conditions while new migrations and/or inserts are processed. For example, if an out-of-memory condition occurs while a new row is being inserted and/or a page-based storage 320 row is being migrated to IMRS 210, the SA 200 can rollback any partial changes made to bring rows in-memory (e.g., any information changed as part of an attempt to insert or migrate a row to the IMRS 210). The insert and/or update can then be transparently redirected to perform the same operation(s) within the page-based storage 320, which can avoid memory errors.

In some implementations, the SA 200 can handle low memory and/or out-of-memory conditions while existing rows are updated. For example, if a row is already present in IMRS 210, then an update and/or delete to this row can be attempted to be processed in IMRS 210 as a first preference, in order to retain hot rows in-memory. If a low memory and/or out-of-memory condition is detected while processing the update and/or delete, then the SA 200 can first pack the committed row to the page-based storage 320, and then redirect the incoming update and/or delete transparently to the page-based storage 320. Packing can ensure that latest committed row is present on page-based storage 320 before update and/or delete modifies the row on page-based storage 320.

Large Object Column Support

A DRC-enabled table's schema can include LOB columns in-row and/or off-row, with the semantics and/or behavior supported for a page-resident table. In some aspects, in-row LOB length criteria and/or limits can apply in relation to a page size of the SA 200. In some aspects, an in-memory row with off-row LOB columns can have the same row format as an on-disk row, such as a format with an embedded text pointer to the first text page (FTP) of an off-row LOB page chain.

Updates to LOB columns for a page-based row, in-row and/or off-row, can operate with little to no modification. However, frequent updates to a row may cause row migration to the IMRS 210, which can be migrated along with a movement of an in-row LOB column to an off-row LOB. Updates to in-row LOB columns for inserted or migrated rows can be done by producing a new in-memory row version with the expanded in-row LOB column. If an update to the in-row LOB columns allow the updated row to be retained in-row, the new row version can store the column value in-memory.

When an update of a LOB column (and/or an expanding update of a variable-length column), causes an in-row LOB value to move off-row, the new row version created can contain a text pointer to the FTP of the off-row LOB page chain. In some aspects, movement of the LOB value from in-row to off-row can be a fully-logged operation in the page-based storage 320, captured in the system log 380. Additionally or alternatively, changes to an in-memory component of a LOB column can be captured in the IMRS log 370 as part of the commit. In some implementations, a shrinking update of an off-row LOB column's value can migrate the value in-row. This shrinking update can result in a logged, page deallocation of of-row LOB page chains in the system log 380, and/or the new in-memory row version can be created with the updated, smaller in-row LOB value.

Frequent updates to a row in the page-based storage 320 may trigger row migration to the IMRS 210. If an in-row LOB column is updated, such that it continues to remain in-row, then the migration process can involve creating and/or caching a new row-version, with the expanded in-row LOB column value, in the IMRS 210. If an in-row LOB column is updated, such that it moves off-row, then the row can be first cached in the IMRS 210 (as part of the migration), and then the off-row LOB column can be allocated as part of migrating the new row version. If an existing off-row LOB column is moved in-row as part of an update and/or subsequent migration, the movement of the off-row LOB column to in-row can be done to the new row version created after the row is cached in the IMRS 210.

If an inserted row in the IMRS 210 contains only in-row LOB columns, then a delete can be performed normally (e.g., as described herein). However for deletion of a migrated row, if it includes only in-row LOB columns, the counterpart row in the page-based storage 320 may be deleted through walking back all the off-row LOB columns and deallocating their page chains. As the row in the IMRS 210 may no longer have off-row LOB columns, whereas the original may have had several, an optimization can be provided to carry-forward the state of each LOB column which was off-row when the row was migrated to the IMRS 210. This can be used to correctly and efficiently drive the page deallocation of those LOB columns which were off-row before migration.

Another scenario can be where the in-memory row has some off-row LOB columns and off-row LOB values in the counterpart page-based storage 320 row. This can arise when a row with off-row LOB values are migrated to the IMRS 210, followed by updates that bring the off-row values in-row, followed by more updates which cause these in-row values to be migrated off-row. Deletion of such a row from the IN/IRS 210 can require deallocating the off-row page chains of the latest version of the row, along with deallocating the off-row page chains of the page-based storage 320 counterpart version of the row.

Another scenario can be where frequent updates to an in-memory row produce multiple intermediate, uncommitted versions with off-row LOB chains for some columns and not for others, where the LOB values may toggle from off-row to in-row across update versions. Then the row can be deleted within the same transaction. Intermediate updates to an off-row LOB column can be performed as a delete and/or insert, so the page-deallocation of off-row LOB columns in older versions can be done in-line with the statement. The memory reclamation of these intermediate versions can be performed via garbage collection 280, which can hand off the FTP handle for embedded off-row columns to another LOB page deallocation background thread.

Garbage Collection 280

Keeping older versions can be beneficial, as certain procedures can be provided which require a version of a row which is not the latest. Additionally, memory can be optimized by avoiding row forwarding, which can cause holes in memory because a new image of a row may not be exactly the same size as an old image of the row. Instead, new rows can be added for updates of existing rows, which can reduce the number of cache invalidations. Further, avoiding in-place updates can aid in rollback of a transaction without requiring the transaction log 380.

However, in some aspects, without garbage collection 280, the IMRS 210 may eventually run out of memory and/or become unusable. Support for garbage collection 280, can be provided for IMRS-enabled databases. Garbage collection 280 can be configured to free up pieces of memory which are no longer required, such as rows, row versions, metadata for a row, pages, transactions, and/or the like. Additionally or alternatively, garbage collection 280 can free up space occupied by data in-memory which can be marked as cold, which can provide space for hot or otherwise warmer data to be stored within the IMRS 210.

In some aspects, garbage collection 280 should not consume processing power trying to visit each piece of allocated memory to check whether the data stored has become obsolete, as this can bring down the overall throughput of the SA 200. If the garbage collection 280 is able to free up space as soon as it becomes obsolete, then wasted space in the IMRS 210 can be reduced. With less wasted space, more hot data can be pulled into the IMRS 210 which can increase the overall throughput of the SA 200.

As described herein, IMRS 210 rows may be modified by creating a newer version for the row, while still maintaining older version(s) of the row, which can be linked through a list, such as a singly linked list which links all (existing) versions of a row. In some implementations, rows can have an immutable in-memory header structure, off of which hangs multiple in-memory versions, the memory for which may be periodically reclaimed. Additionally or alternatively, each version can have its own data row buffer to facilitate easy reclamation of version memory via garbage collection 280.

Dump/Load Support

Full support for dump database, load database, and/or load transaction operations can be provided for IMRS-enabled databases. In some implementations, cumulative database dump operations may not be supported. The activity generated by the Pack thread, or the equivalent use of the IMRS_PACK built-in, can be also fully recoverable from transaction log dumps.

A database dump operation on an IMRS-enabled database can dump the database contents plus the contents of the ODRS (e.g., the IMRS log 370). Successive transaction dump operations can dump the portion of the system log 380 that are newly generated plus the delta portion of the IMRS log 370. However, due to log truncation issues in the ODRS, the size of the IMRS log 370 that is captured in each transaction dump operation archive may be larger than the corresponding the system log 380 portion. Therefore, it is possible that transaction log dumps in an IMRS-enabled database may be larger than the same transaction log dump size for a similar non-IMRS 210 database for the same concurrent OLTP workload. Full recoverability can be ensured through a load database operation followed by loading the transaction dumps in sequence.

For database dump operations, the contents of the entire database can be saved to an archive using database dump operation(s). The set of pages containing database data, and transaction logs can be saved. For an IMRS-enabled databases, database dump operations may not save the in-memory contents of the IMRS 210, but only the log records saved in IMRS log 370. After an initial database dump operation, the periodic changes applied to the database can be saved using just the transaction logs, through an operation known as a transaction dump operation. Several transaction logs can be collected using a series of such transaction dump operations. In comparison to a database dump operation, periodically saving the transaction log can be a much faster operation (in amount of time taken) and in the amount of archive data generated. As an example, for a 200 GB database, periodically dumping the transaction log every ten minutes may generate only about few GBs of archive data, which makes managing load transaction operations easier.

Load database and/or online database operation: The process of restoring a database from archives collected using database dump and/or transaction dump operations can work as follows: (A) a load database operation restores the contents of the entire database from an archive generated earlier using database dump operation(s). After the contents are restored, the database is recovered using the transaction logs contained in the dump. The database can be offline and/or can be brought online using an online database operation, which completes the undo phase of recovery processing. (B) Periodic changes that are archived using transaction dump operations can be recovered using load transaction operations. The database contents are initially loaded using a load database operation, and one or more transaction logs can be loaded back in sequence using load transaction operation(s). Each load transaction operation can perform redo-recovery of the contents in the transaction log loaded. Finally, after the required number of transaction logs are loaded, the database can be brought online using online database operation(s).

Index 330

Figure 8:
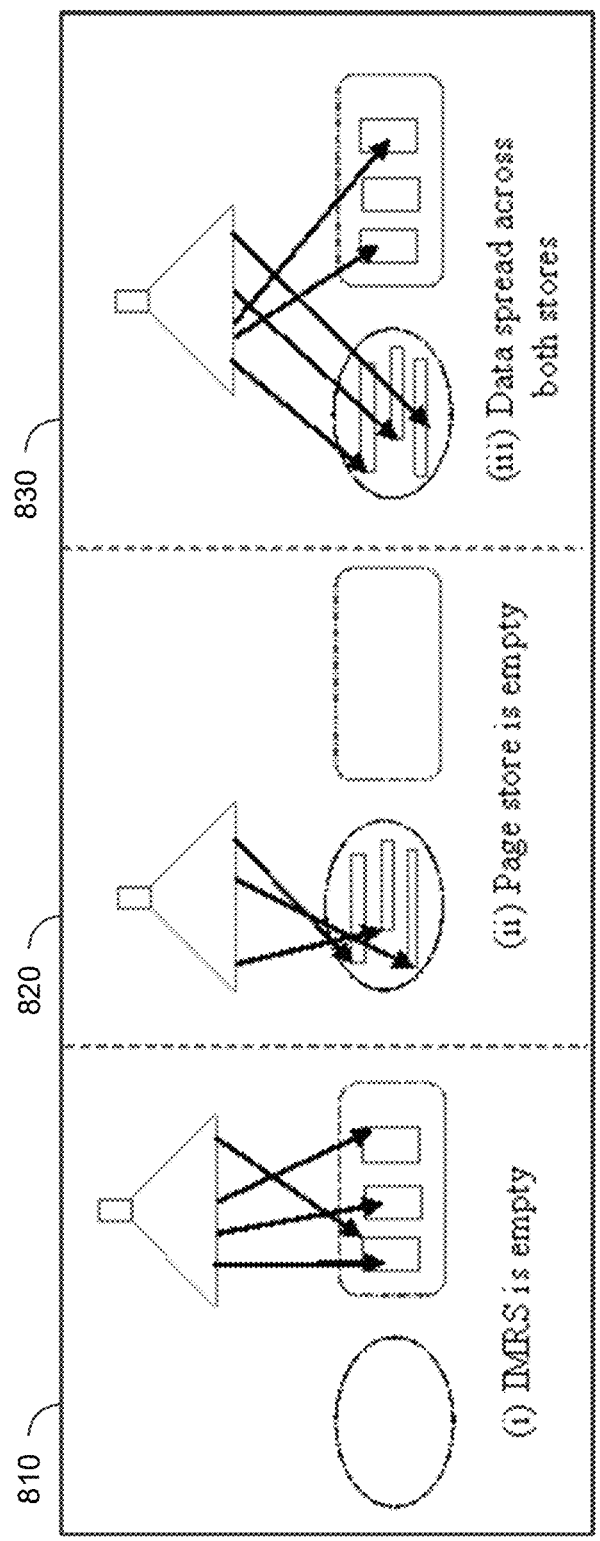
FIG. 8 illustrates example layouts/forms of a B-tree index spanning a page-based storage and IMRS, in accordance with some example implementations.

In some aspects, a B-tree index storage structure can be adopted/leveraged for features described herein, such as DRC 222. The index layer can be a fully-logged page-based and recovered index, providing access to rows either in the page-based storage 320 or the IMRS 210. FIG. 8 illustrates example layouts/forms 810-830 of a B-tree index spanning a page-based storage 320 and IMRS 210, in accordance with some example implementations. A few different combinations can arise, as described herein.

Form 810 can arise when an existing table with an index is enabled for DRC usage. Existing rows continue to remain in the page-based storage 320, and the IMRS 210 for this table is currently empty. The index leaf rows span just the rows in the page-based storage 320.

Form 820 can arise when an empty table is enabled for IMRS 210 usage, then new data is inserted to the table. All new inserts may go to the IMRS 210. Subsequently, when an index is built (or if there was a previously existing index on the empty table), the index now spans just the rows in the IMRS 210.

Form 830 is a more general scenario, which can occur for an IMRS-enabled table to which new rows are inserted or existing rows are migrated from the page-based storage 320 to the IMRS 210. Row migration can happen when the Data Row Caching schemes are triggered based on some heuristics which cause rows that are frequently scanned or updated (e.g., "hot" rows) to be migrated from the page-based storage 320 to the row store. Over time, the index can now span rows residing in both stores.

Row Migration can be a technique offered by the storage layer. Rows that are frequently scanned or updated may be relocated from the page-based storage 320 to the IMRS 210. The index entries for such rows remain unchanged, but while scanning the data rows via the index, the RID-MAP lookup table can be consulted to find the new location of the row. Future updates to the row are then performed in the IMRS 210. After row migration, two "copies" of the row may exist in the database, but once migrated, the latest version of a row may be known to be in the IMRS 210. Row migration as an access layer feature enables the overall DRC 222 offering. For frequently scanned rows, row migration can be employed again to move the row to the high-performance IMRS 210 resulting in what can be referred to as "cached rows".

IMRS Log 370

In some implementations, a new physical persistence component can be provided, such as an On-Disk Row Storage (ODRS) log. The contents of the IMRS 210, and the changes done to it (e.g., by DMLs) can be captured in the ODRS log. The ODRS log can include the IMRS log 370 to access the contents of the ODRS log (e.g., similar to a transaction log and/or using SQL access). In some aspects, the IMRS log 370 can include a system catalog and/or be in a "table-oriented" layout.

FIGS. 3-5 illustrate example layouts of the ODRS log. The ODRS log can be a region of the database, in terms of some dedicated devices created using existing database management system interfaces, ear-marked as the persistence region for data contained and changed in the IMRS 210. In some implementations, the ODRS log can be used for logging the changes from committed transactions and/or as the storage repository from which the contents of the IMRS 210 are re-instantiated during crash recovery.

Similar to how the IMRS 210 can be a row-oriented extension to the page-based storage 320 and the buffer cache 325, the ODRS log can include a page-oriented image of the contents of the row-oriented IMRS 210 within the database space. For example, configuring a 20 GB IMRS 210 may also require approximately 20 GB of database device space to persist the IMRS 210 to the ODRS log. The exact sizing details of the ODRS log in relation to the size of the IMRS 210 can vary depending on the implementation.

As the ODRS log can be part of the database physical storage region, the ODRS log can provide complete integration and/or support for archive management operations such as database dump operations, transaction dump operations, load database operations, load transaction operations, extensions to the Backup Server methods (e.g., compressed dumps), integration with IBM Tivoli Storage manager, and/or the like.

In some implementations, the ODRS log can include entities defined as part of a storage layer (e.g., database storing one or more table) of a database management system. For example the ODRS log can include database devices of a specific type, which can be defined for usage by this storage layer. The ODRS log can include a segment identifying the space allocated to the IMRS log 370 and/or the ODRS log.

The contents of the ODRS log can be captured in a database dump archive. Periodically, the contents of the IMRS log 370 can be captured as part of a transaction dump operation archive. Full dump and/or load recoverability can be provided for databases created with an IMRS 210, including for database and transaction log dumps. The contents of the ODRS log captured in the database dump and/or transaction log dump archives can be used to re-instantiate the contents of the IMRS 210. In some implementations, incremental dump and/or load functionality can be extended to the archive management for a database containing the ODRS.

Load database and/or load transaction operations can work the same way when loading an archive into an IMRS 210. The ODRS portion of the archive can be loaded into the IMRS log 370 and/or devices of a particular type. Existing support for loading using stripes and other performance enhancing features for loading ordinary DRDBs can be applicable when loading archives into an IMRS 210. However, difference can arise after a load operation when recovery can be performed in the database. The performance characteristics of recovering data directly into the IMRS 210 are discussed in the following section.

Logging and Recovery Support

A technique referred to herein as "commit-time logging" can be implemented when a transaction affects rows in the IMRS 210. In some aspects, in-line logging for changes done on a per-row basis to rows in the IMRS 210 can be skipped. In some implementations, multiple (e.g., all) changes done to an in-memory row are accumulated and/or aggregated logging of the multiple changes is performed at commit-time. For example, if a row is updated multiple times in the same transaction, rather than logging the changes arising from each update individually, only the final image of the row may be logged to the IMRS log 370. Run-time rollback can be performed using in-memory versions of the affected rows and/or the changes done to them by one or more transactions. Rollback to a save point can be also implemented, such as by using in-memory version changes without access to the IMRS log 370. Changes to the B-tree indices can be fully-logged, and may be undone and/or redone using log records. Commit-time logging, aggregated logging, and/or rollback using in-memory versions can contribute to enhanced performance and/or reduced contention due to fewer accesses to the system log 380 for the page-based storage 320.

In some implementations, while making changes to in-memory rows, no data pages and/or buffers are involved. Doing so can remove issues with pinning dirty buffers to a tasks' PLC or to the system log 380. This can help overcome contention and/or scalability issues around buffer pining and/or unpinning involving transactions and the system log 380.

If commit-time only logging and/or in-memory run-time undo (which may not be log-based) are leveraged, the IMRS log 370 can include a redo-only log. In some implementations, undo logging might not be seen in the IMRS log 370. Thus, when a load database and/or load transaction operation is performed to a database containing an IMRS 210, highly parallelized redo-only recovery can be supported for the data rows in the IMRS 210, which can accelerate the recovery times for databases with a large IMRS 210 and/or holding a large numbers of rows.

If a transaction accesses page-store tables 520 and IMRS-enabled tables 515, the log records generated can be both in-line in the system log 380 (e.g., log records affecting page-based storage 320 rows can be generated when the update occurs) and at commit-time in the IMRS log 370. Commit processing can therefore require committing both "legs" of the transaction spanning the system log 380 and the IMRS log 370. However, this can be achieved by a concurrent commit operation without requiring a two-phase commit sequence. An error to commit any one side of the operation can result in a transaction rollback. The portion of the transaction that is logged in the system log 380 can be rolled-back using the log records for changes done to page-based storage 320 data, whereas changes done to in-memory rows can be rolled-back using the in-memory versions without need for any access to IMRS log 370. Logging protocols and access to the two logging streams can be transparent to the client application.

The IMRS log 370 can be provided by devices dedicated to a single database. In some aspects, all pages of the IMRS log 370 may be serially allocated and/or linked. Pages can be fully allocated when the ODRS is created, and/or the IMRS log 370 pages might not be deallocated at run-time. The active portion of the IMRS log 370 can be tracked using metadata hanging off a database table. IMRS log 370 page chains may be truncated to release space when older transactions are archived, but truncation may not require page deallocation. In some implementations, only the page markers to the active portion of the IMRS log 370 are updated in the metadata of the database table.

Space needed for a transaction to commit its changes can be "pre-reserved" by a transaction at its commit time. At run-time, each transaction can track (e.g., by using counters) the amount of space it may need to write its log records. At commit time, exclusive access can be granted to one task for a brief instant, at which time the required number of pages and/or space in the current last log page of the IMRS log 370 can be reserved and/or assigned to the committing transaction. The exclusive access can then be released, allowing the next committing transaction to reserve its required space. This scheme can be referred to transaction blocking, where a block of space in the IMRS log 370 can be blocked and assigned to different transactions. Then, multiple concurrently committing transactions can formulate their log records using the in-memory versions of rows updated by each transaction and/or write directly to the IMRS log 370 buffers simultaneously. This scheme can provide multiple insertion points to the IMRS log 370, thereby removing last log page bottlenecks and/or log-contention issues that may exist with the system log 380.

Figure 9:
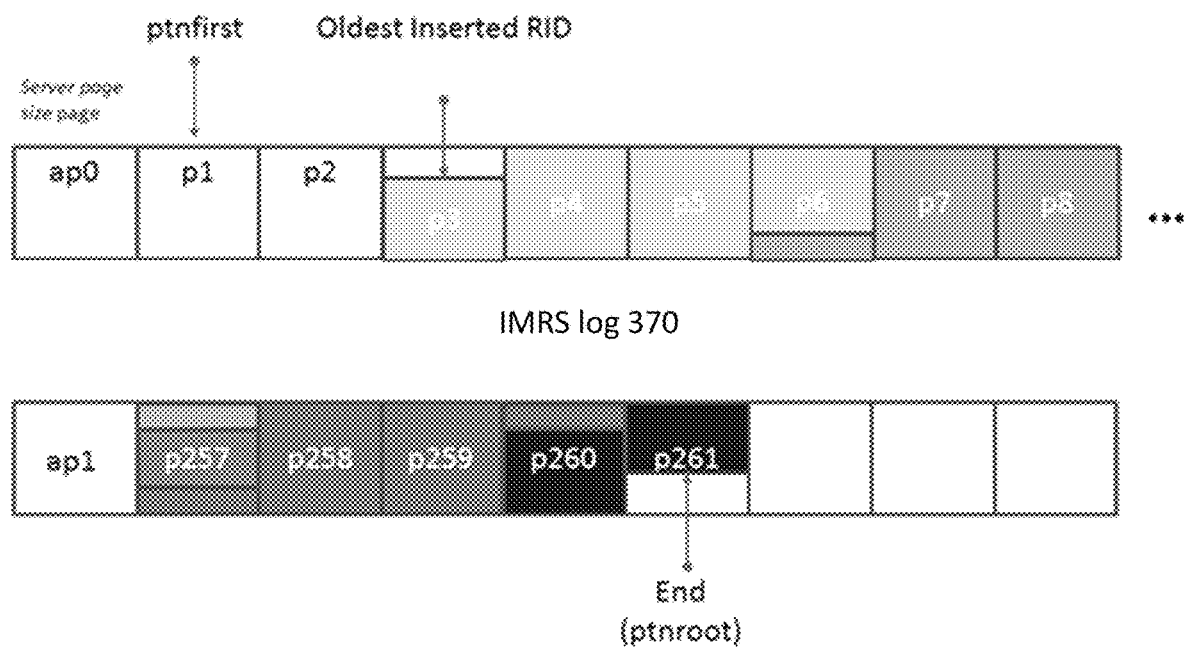
FIG. 9 illustrates a layout of pages allocated to different concurrently committing transactions, in accordance with some example implementations.

FIG. 9 illustrates a layout 900 of pages allocated to different concurrently committing transactions, in accordance with some example implementations. In FIG. 9, the active portion of the IMRS log 370 can be from page identifier "p1" to page identifier "p261". Different shades of the pages (sequence of pages) represent space allocated and/or reserved by different transactions. Log records generated by individual transactions can appear contiguously on these pages. Some pages can hold log records from multiple transactions. For example, pages p6 and p260 illustrate examples where the same page can be shared by log records generated by two different transactions. Page p257 can be an example of a shared page where three different transactions write their log records on the same page. In some aspects, space can be saved by allocating an entire page to different transactions. Fully-allocated pages (e.g., no page allocation or de-allocation at run-time during a user transaction), transaction blocking, and/or multiple insertion points can work together to deliver enhanced transaction logging and/or commit-rate performance when changes are done to in-memory data.

Crash Recovery

Figure 10:
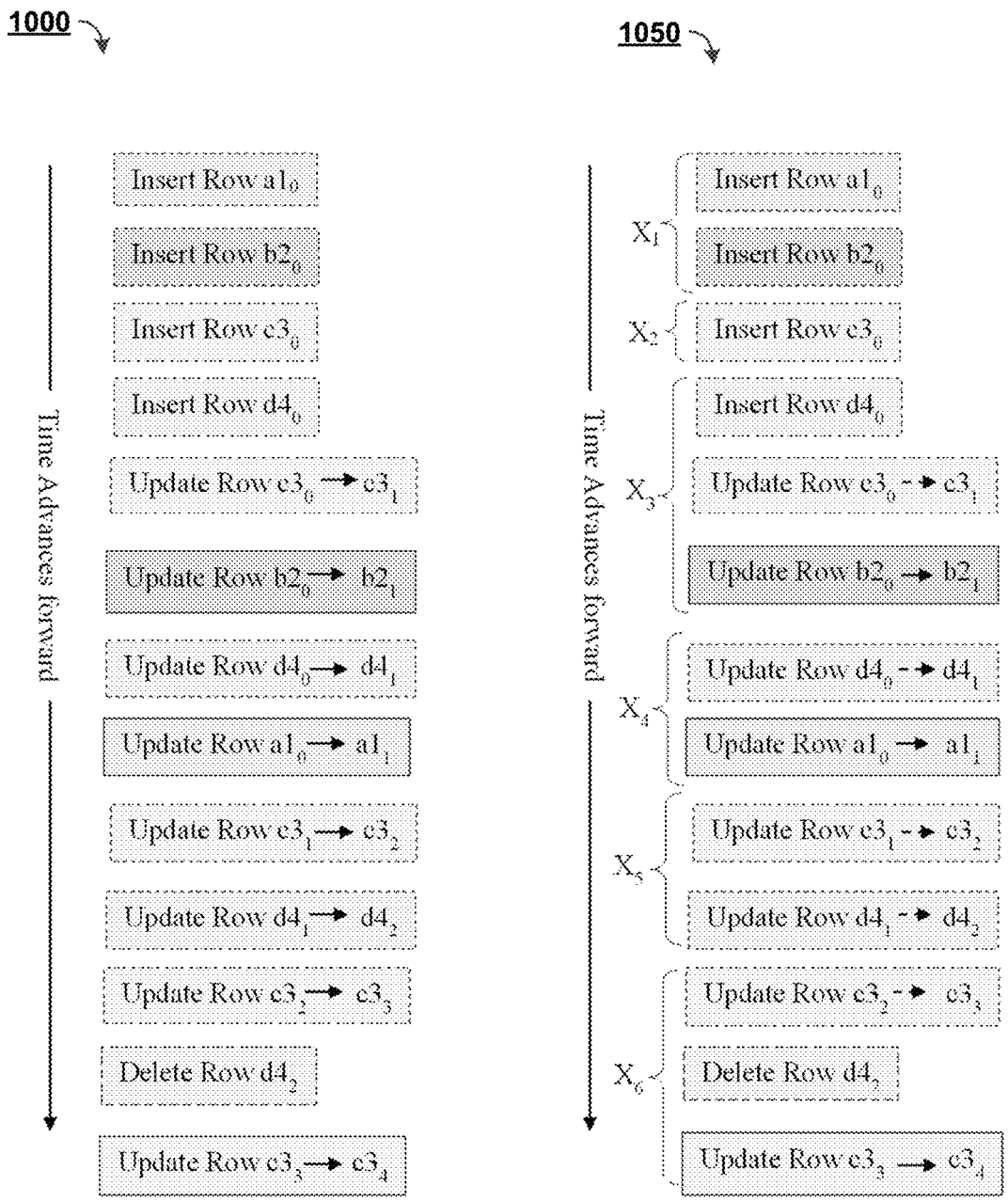
FIG. 10 illustrates a sequence of log records generated affecting in-memory rows in two transaction streams, in accordance with some example implementations.

When a server is rebooted, such as after a normal shutdown or a crash, recovery may need to re-instantiate the contents of committed rows in the IMRS 210 as they were at the time when the shutdown and/or crash occurred. FIG. 10 illustrates a sequence of log records generated affecting in-memory rows in two transaction streams 1000 and 1050, in accordance with some example implementations.

Recovery performed from system log 380 affecting page-based storage 320 data can be timestamp based. For example, each log record affecting a data row can hold the before and/or after time stamp of the data page, recorded as part of the change (e.g., insert, update, delete) performed to some data row on the page. At the time of recovery, the contents of the data pages can be examined, comparing the time stamps on the page to those in the system log 380. If the examined page time stamp matches the time stamp recorded in a specific log record, the changes from that log record can be applied to the affected data page, recovering the individual data row. The series of log records affecting a page can move the changes applied to the page in a forward direction, whereby the old time stamp in each log record affecting a row matches the new time stamp of the previous log record affecting some row on the same page.

In a system log 380 based on an in-line logging model, at crash recovery time, a server may need to go through the entire contents of the system log 380. In a system log 380 based on a timestamp-based recovery model, at crash recovery time, the server may need to go through a sequence of redo and undo phases. Each log record found in the system log 380 can be visited and may be applied to go through the series of changes that were made to the data pages at run-time. As an example, a transaction log containing 10,000 transactions, each affecting one of five rows, can have 2,000 log records affecting each of these five rows. In the worst case, recovery can reapply each of these 2,000 operations on the five affected rows.

This scheme can be optimized for transactions that affect in-memory rows, where the changes done to rows in the IMRS 210 at run-time may not be time stamped. During recovery, each version of the row resulting from all these updates can be inserted to the IMRS 210. At the end of recovery, the final version of a row that resulted at run-time can be recovered and re-instantiated to the IMRS 210 as the latest version of the row.

This scheme is explained below with some examples. Each table affected is named with upper-case letter (e.g., A, B, C, etc.). Rows from each table are labeled with lower-case letters. For instance, rows from table C are labelled c1, c2, c3, c4, and so on. Each row can have a distinct identity, referred to as Row-ID (row identifier). When a row is updated to create a new version, it is indicated by a subscript to the row. For example when row c2 from table C is updated five times, it produces the following sequence of row-versions: $c2_0 \rightarrow c2_1 \rightarrow c2_2 \rightarrow c2_3 \rightarrow c2_4 \rightarrow c2_5$ Row version $c2_0$ can be referred to as the "base" or first inserted version of this row. Row version $c2_5$ can be the most recent version that is committed to the database and/or may need to be recovered from the IMRS log 370. As every update can produce a new version, this row can go through a unique transition from the sequence.

Consider the following series of statements, where each statement is a transaction:

(1) Insert one row each to tables A, B, C and D to the IMRS 210

(2) Update row a1

(3) Update row b2

(4) Update row c3 four times (5) Update row d4 twice, and then delete it

Assume that, after (1) which inserts the rows to the IMRS 210, each statement (transaction) updating different rows run in an interleaved manner. One possible state of the log records reflecting these operations can be as shown in FIG. 10, executed in two different transaction streams 1000 and 1050. The shaded boxes indicate each affected row.

As illustrated in FIG. 10, transaction stream 1000 includes a series of transactions with one statement per transaction affecting different rows from four tables. In transaction stream 1050, the same set of statements are executed in six transactions, labeled X1 through X6, with potentially varying numbers of statements per transaction. The choice of transaction boundaries across statements (transaction footprint) can vary based on the implementation. Transaction stream 1050 shows transaction blocks where all log records from one transaction appear in a sequence in the IMRS log 370. In both transaction streams 1000 and 1050, the final version of the row that is committed to the database is shown in boxes with solid border lines. Previous versions of the rows are shown in boxes with dashed border lines, indicating that they do not need to be recovered. For example, row version $d4_2$ is shown in a rectangle with long-dashes to indicate that it's finally deleted from the database.

In a basic recovery scheme, similar to recovery in the system log 380, the log records from the IMRS log 370 can be replayed from the start (e.g., insert of $a1_0$) through the last record. Each new insert to the same row can effectively delete the previous version from the IMRS 210 (which can be handled via garbage collection 280). Eventually, the IMRS 210 contains only committed versions of the affected rows. In this scheme every log record needs to be replayed, causing memory usage of the IMRS 210 and re-instantiation of older potentially obsoleted versions in the cache. However, as recovery can be creating these intermediate versions, the memory for older versions can be efficiently reclaimed by garbage collection 280 immediately after a new version is created for a row by recovery.

Crash recovery performance can be further improved by parallelizing recovery by tables and/or partitions (e.g., assigning a thread to recover rows belonging to one object partition/table). In a simple scheme, n+1 parallel threads are used. A first thread can read the log records, accounting for transaction boundaries and commits. The first thread can distribute the log records affecting a partition with an identifier n to the $n^{th}$ recovering thread. Doing so can provide a parallelism, without having all threads read an entire log multiple times.

Recovering the IMRS 210 from IMRS Log 370

When the server reboots, the contents of the IMRS 210 can re-instantiated by going through at least a portion (e.g., all) of the log records in the IMRS log 370. This process can be referred to as IMRS-Recovery. IMRS-recovery can be performed with different variations in different scenarios. For example, IMRS-recovery can be performed upon server reboot from either a normal shutdown or a server crash, after a load database operation, after a load transaction operation, as part of an online database operation, and/or the like.

In some implementations, the processing of log records in the IMRS log 370 for the purposes of instantiating the IMRS 210 can be more or less the same for crash recovery, load database operation recovery, and/or load transaction operation recovery. Redo of log records in IMRS log 370 can have some similarities with a redo of log records in the system log 380. One notable difference is that unlike a data page, a row cannot be from the future. Thus, a redo of system log 380 log records may need to determine whether the log record should be applied or not, based on an old timestamp and new timestamp pair in the log record, and/or the timestamp on the page itself. Redo of log records for rows can be required as there may be no future version of the row on disk already. Redo of a log record may not be required if the row is not to be instantiated in the IMRS 210 at all (e.g., if a log record can be seen for a row that may ultimately be deleted before the end of recovery). Recovery of rows can start with processing an IMRS 210 insert command log record for the row, then each log record affecting the row after this, in order that the row can be brought to its latest version. The recovery of the system log 380 and IMRS log 370 may take place in parallel. That is, there can be a task that recovers the system log 380 and a separate task that recovers the IMRS log 370. In some aspects, more than one task can also recover IMRS log 370 in parallel. There can be various synchronization points between the two logs, such as when the output from a phase in the IMRS log 370 is needed as input for the next phase of the system log 380 recovery.

There can be multiple phases in recovering the IMRS 210, such as a fix phase, a redo phase, a reconciliation phase, and/or the like. In the fix phase the IMRS log 370 may be scanned from the fully committed transaction to then end of the IMRS log 370. As part of the fix phase, complete and/or incomplete transaction blocks can be identified, and/or the IMRS log 370 can be adjusted by patching incomplete transaction blocks. This phase can also generate an in-memory table of incomplete transactions (e.g., Invalid Block Table) to facilitate reconciliation of cross log transaction. This phase can also identify the number of committed transactions after the fully committed transaction. As part of the redo phase, the IMRS log 370 can be operated upon from the oldest inserted transaction to the fully committed transaction. Potentially, this phase can be done with multiple threads to recover the log records in IMRS log 370 in parallel. As part of the reconciliation phase (also referred to as redo and reconciliation), the IMRS log 370 can be operated upon from the transaction after the fully committed transaction to the last committed transaction. The reconciliation phase can use a single task to redo log records in completed transaction blocks, reconciling these transactions with the system log 380 for transactions that have a linked system log 380 transaction.

Figure 11:
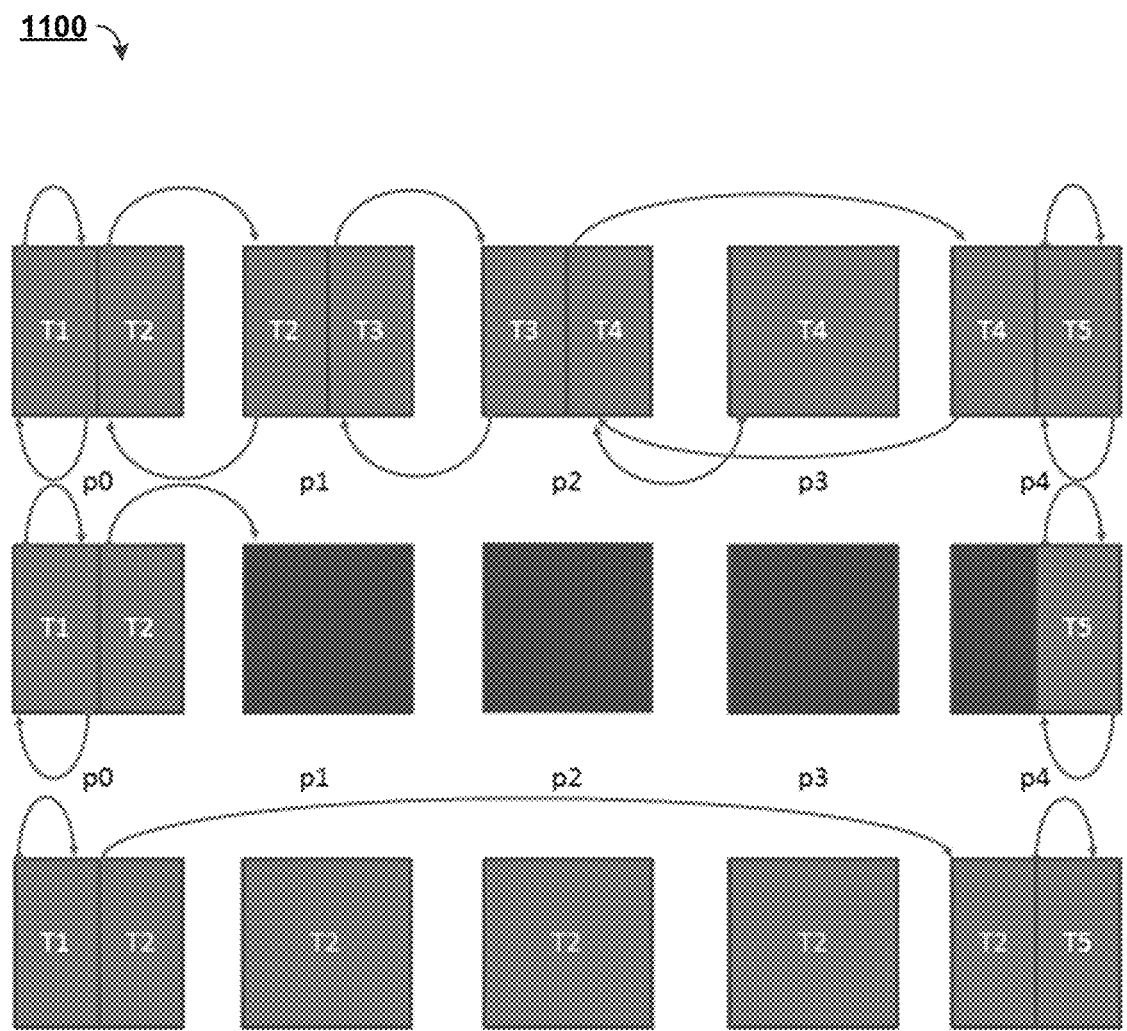
FIG. 11 illustrates a portion of IMRS recovery, in accordance with various implementations.

As part of the fix phase, the log can be operated upon from the fully committed transaction to the end of the log. During this phase, incomplete transaction blocks can be identified and/or fixed to link the page chains of IMRS log 370 around portions of the log containing such incomplete transaction blocks. After this is done, a scan of the IMRS log 370 for log records can be performed without having to navigate around log records from incomplete transaction blocks. The fix phase can also include generating an in-memory table of incomplete transactions (referred to as an Invalid Block Table) so that the System log 380 analysis pass can reconcile the final transaction state of cross-log transactions that appear to be committed in the system log 380, but which are incomplete in the IMRS log 370. This phase may also recover the root pointer of the IMRS log 370 using the last known page number in a stored database information structure, which can include an internal metadata structure holding database space information. Generating the in-memory table of incomplete transaction blocks can be done while recovering the IMRS log 370. When a hole is found, the opportunity can be used to insert an entry for each incomplete transaction into the Invalid Block Table. The example in FIG. 11 shows a case where multiple committing transactions (top line), result in a single hole after a crash (middle line). Recovery can fix the hole by making it a single transaction block which should not be redone (e.g., bottom line): At the end of recovering IMRS log 370, the Invalid Block Table can be complete and the system log 380 analysis pass can be able to use this to reconcile the IMRS log 370 and the system log 380 transactions that appear to have committed.

As part of the redo phase, recovery can operate from the oldest inserted transaction (identified from a database information structure) until the fully committed transaction (also identified from the database information structure). Between these two markers, the log can be considered fully repaired. Specifically, since the point up to which IMRS log 370 was last recovered, all transaction blocks may be completed and therefore contain log records that need to be redone, which can be true also of cross-log transactions. That is, such transactions may have both flushed all system log 380 and IMRS log 370 log records to disk at the time of commit.

Additionally or alternatively, for the section of the log that precedes the point up to which IMRS log 370 was last recovered, any hole may have been fixed by the previous recovery. That is, the hole can be changed into an aborted transaction block. Recovery can be configured to skip such blocks and/or identify the RID(s) which it should skip. Any formerly committed transaction block that was part of a cross-log transaction can be changed into an aborted transaction block if recovery found the transaction to be incomplete in the system log 380.

Therefore, recovery can be able to scan this section of the log, locate log records to be redone (e.g., those in committed blocks), and/or locate those that should be skipped (e.g., log records in aborted blocks). These operations can be done by a serial scan of the IMRS log 370, which can return only log records belonging to committed transaction blocks.

As part of the serial redo and reconciliation phase, recovery can operate on the IMRS log 370 from the fully-intact log marker to the end of the log. These operations can start by completing the deleted rows table by appending the remaining deleted rows to the deleted rows table if it already exists (e.g., as it does in crash recovery). This can be done based on scanning the IMRS log 370 from the most recent IMRS 210 deleted rows log record (from a database information structure) to the end of the log, looking for the IMRS 210 delete log records and adding these as entries to the deleted rows table. If a deleted rows table does not yet exist (e.g., during a load sequence), then a deleted rows table should be generated first from IMRS 210 delete rows log records. Following this, recovery can redo log records for committed transaction blocks and/or skip log records for aborted transaction blocks. The latter can be done automatically by the log scan that returns these log records. In some aspects, cross-log transactions may appear to have been committed in the IMRS log 370 but are uncommitted in the system log 380. Because of the additional complexity of reconciling transactions, this phase can be performed serially by a single task and not in parallel by multiple tasks.

In the same way that for cross-log transactions, a committed IMRS log 370 transaction may need to be reconciled with the system log 380, so too might such a transaction that has committed in system log 380 be reconciled with the IMRS log 370. If the transaction is found to be incomplete in the IMRS log 370, then the system log 380 transaction should be rolled back. A transaction table can be generated in the analysis and fix phase of IMRS log 370, which contains information about aborted transaction blocks. In the analysis pass for System log 380, when processing an ENDXACT log record, a check can be made to see if the transaction was a cross-log transaction. If it is, then the session ID of the IMRS log 370 transaction can be extracted, which can be stored in the ENDXACT log record. Next, the session ID can be used to lookup the transaction table. If the result is not NULL, then there may be either an exact match on the session ID or the session ID can be part of an aborted range. Either way, the transaction did not complete and so it can be aborted in the IMRS log 370. Thereafter, the ENDXACT log record can be overwritten with No Operation (NOOP) log records, so that the transaction appears to be incomplete. Then, the System log 380 transaction can be added to the transaction table as an incomplete transaction. The undo pass may roll it back, writing SQL Server Common Language Run (CLR) database objects and logging a final ENDXACT (abort) log record.

For crash recovery, a key requirement may be that the fix phase precedes the serial redo and reconciliation phase, since the latter requires a fixed log. However, there may be additional dependencies in recovering the IMRS log 370 and recovering System log 380. For example, the IMRS log 370 fix phase can generate the table of incomplete transaction blocks that may be needed by the system log 380 analysis pass. The system log 380 analysis pass can generate another table (that includes incomplete transactions), which may be needed by the IMRS log 370 serial redo and reconciliation phase.

There may be several orderings that satisfy these dependencies, such as the fix phase, followed by the redo phase, followed by the serial redo and reconciliation phase. System log 380 recovery might not be able to start its analysis pass until this is done. The system log 380 analysis pass can be potentially a longer pass since it may need to read the entire recoverable log. Therefore, while this is on-going, the parallel redo phase may be allowed to start. The parallel redo phase can be where most of the time in recovering the IMRS 210 can be spent. This may take more time than the system log 380 analysis pass and/or the System log 380 redo pass. When complete, the serial redo and reconciliation phase can start with the knowledge that the system log 380 X-table is in place, on which it may depend.

The sequence of events in IMRS log 370 and System log 380 for crash recovery can include the sequence in TABLE 2, with dependencies show in parentheses.

TABLE 2

| IMRS log 370 | System log 380 |
|---|---|
| Fix phase | |
| Parallel redo phase | Analysis pass (after IMRS log 370 Fix phase) |
| | Redo pass |
| Serial redo and reconciliation (after system log 380 analysis pass) | |
| | Undo pass (after IMRS log 370 redo and reconciliation; the undo pass can remove entries from the X-table as each incomplete transaction can be completed and/or cannot be done before the serial redo and reconciliation phase which depends on these entries) |

For load recovery, the fix phase might not be done at the time of a load database and/or load transaction operation. This can be because a hole in the IMRS log 370 after transaction log tran1 has been loaded may no longer exist after a subsequent transaction log tran2 has been loaded. This can occur because a transaction that was in the process of committing when tran1 was dumped, may soon be fully committed, so that the hole may now be a committed transaction block when tran2 is dumped.

If the fix phase can be run as part of the loading of tran1, these holes can be marked as aborted blocks and the log records skipped. After loading tran2, the aborted blocks may be committed and/or the log records in the block may be redone. This could require a load transaction operation of tran2, to recover a portion of the log that had already been recovered by a load transaction operation of tran1. In this portion of the tran1, there may be committed blocks. Redoing this section of the log in a load transaction operation of tran2 may require some previously aborted blocks to be redone (e.g., for the first time), but some previously committed blocks may also need to be redone. This can be the case where recovery finds a row for which a log record was previously applied and/or old/new sequence numbers would be needed in the log record to support a conditional redo. In some aspects, it can be simpler to not have a load transaction operation execute the serial redo and reconciliation phase, and therefore not redo any log records between the fully-intact log marker and the end of the log. Instead, the serial redo and reconciliation phase can be done by an online database operation.

Deferring the serial redo and reconciliation phase to an online database operation can have ramifications for cross-log transactions. These transactions may have the same issue in a load sequence as holes. That is, a cross-log transaction that can be committed in one log but not the other in tran1 may be likely to show as committed in both when loading tran2. Therefore, it can be preferred to defer this also to time and/or execution of an online database operation. Reconciling these transactions can require access to the X-table from the system log 380 analysis pass. An online database operation can run a system log 380 analysis pass so that this information is available.

Cross-log transactions that are committed in the system log 380 but incomplete in the IMRS log 370 may also be dealt with at time/execution of an online database operation. The system log 380 redo pass can redo all log records so that, just prior to recovery, such a transaction may appear to have been redone. The online database operation analysis pass can be dependent on the IMRS log 370 fix phase to generate the IMRS 210 X-table to allow such a transaction to be marked and/or rolled back by the undo pass by an online database operation.

The sequence of events in the IMRS log 370 and/or the system log 380 for a load operation can include the sequence in TABLE 3, which may not have dependencies.

TABLE 3

| IMRS log 370 | System log 380 |
|---|---|
| Parallel redo phase | Analysis pass (this may not look for the transaction table since cross-log transactions can be redone). |
| | Redo pass |

The sequence of events in the IMRS log 370 and/or the system log 380 for online database operation recovery at the end of a load sequence can include the sequence in TABLE 4, with dependencies show in parentheses.

TABLE 4

| IMRS log 370 | System log 380 |
|---|---|
| Fix phase | |
| | Analysis pass (after IMRS log 370 Fix phase) |
| Serial redo and reconciliation phase (after system log 380 analysis pass) | |
| | Undo pass (after IMRS log 370 redo and reconciliation; the undo pass can remove entries from the X-table as each incomplete transaction is completed and so it may not be done before the serial redo and reconciliation phase which depends on these entries) |

The recovery done by an online database operation can be staggered. If the amount of work is small enough, the overhead to parallelize these work items may be reduced.

Figure 12:
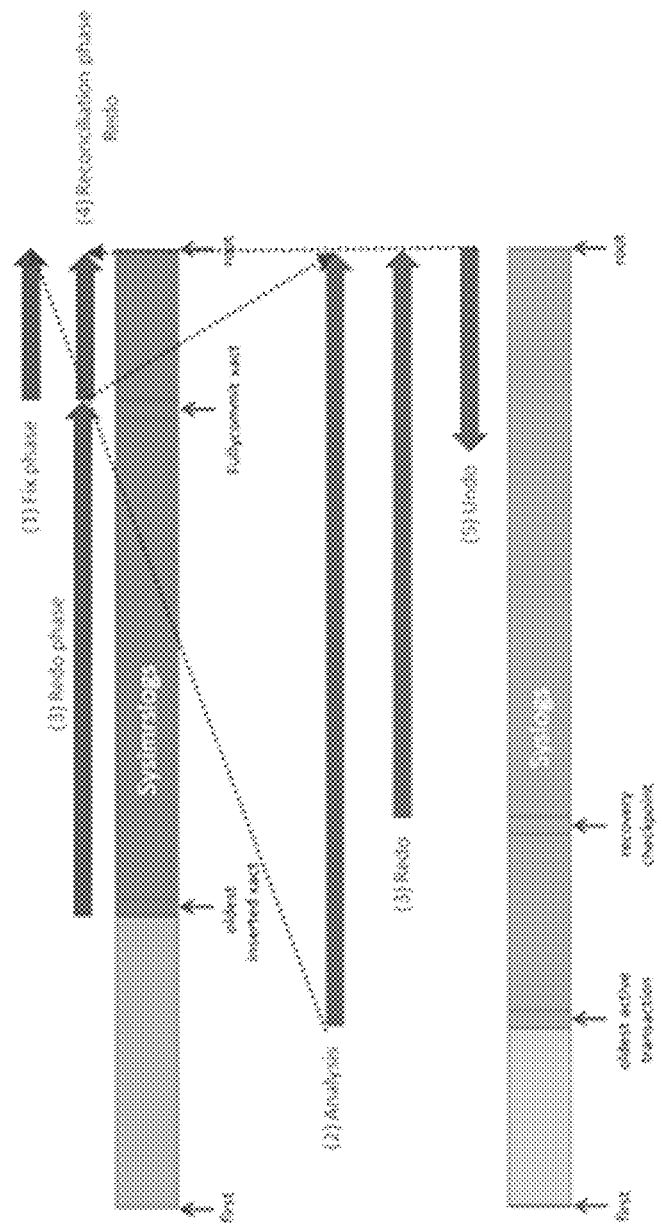
FIG. 12 illustrates an overview for crash recovery, in accordance with various implementations.

FIG. 12 illustrates an overview 1200 for crash recovery, in accordance with various implementations. Different recovery passes may be provided on IMRS log 370 and System log 380. Dotted arrows indicate dependencies.

Figure 13:
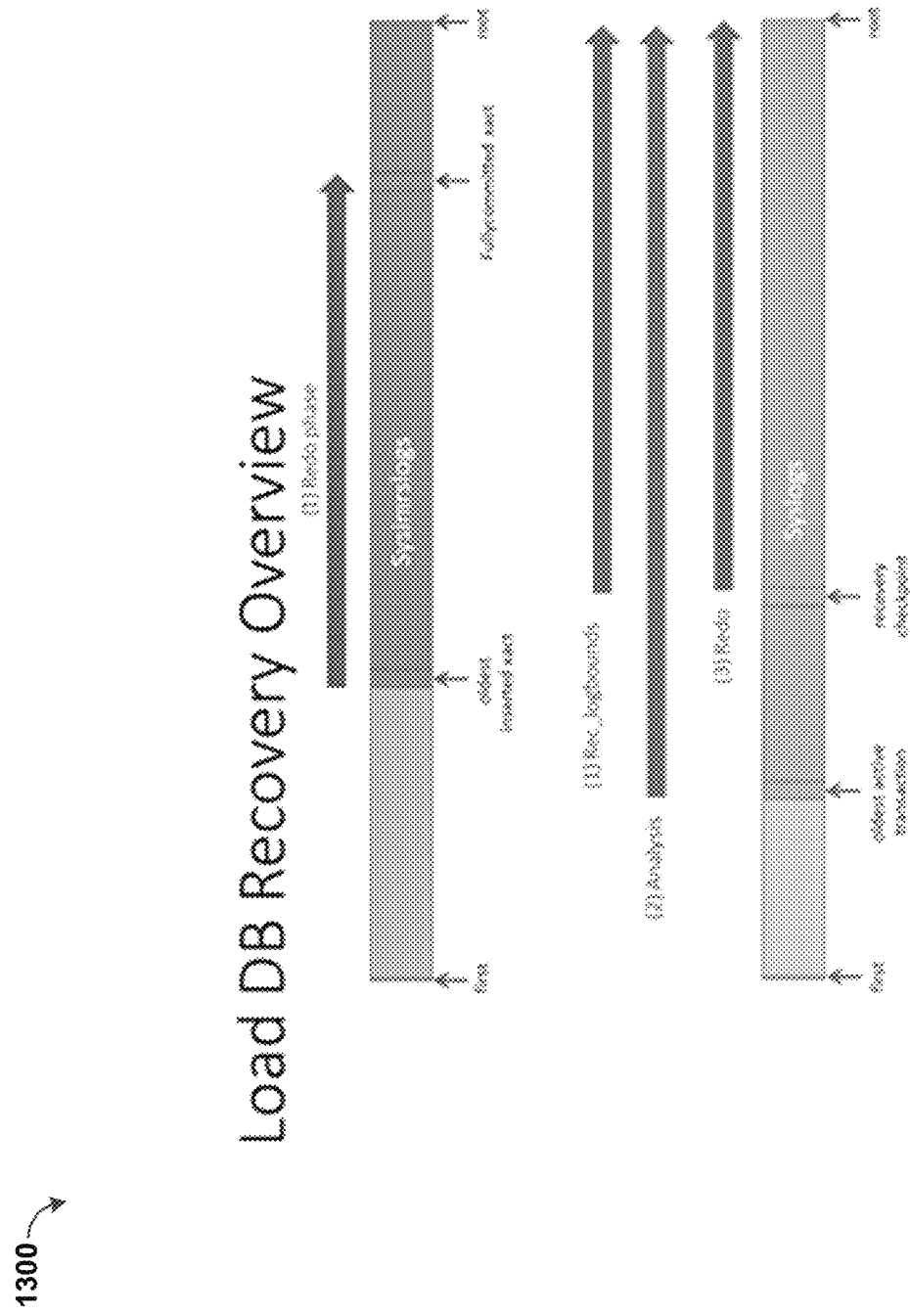
FIG. 13 illustrates an overview for a load database operation recovery, in accordance with various implementations.

FIG. 13 illustrates an overview 1300 for load database operation recovery, in accordance with various implementations. Load database recovery may not have the fix phase nor the reconciliation phase. If a server crashes in load sequence, crash recovery may recover the IMRS log 370 using a load database operation rule, because the IMRS 210 cache may need to be refilled from oldest inserted row transaction to fully committed transaction.

Figure 14:
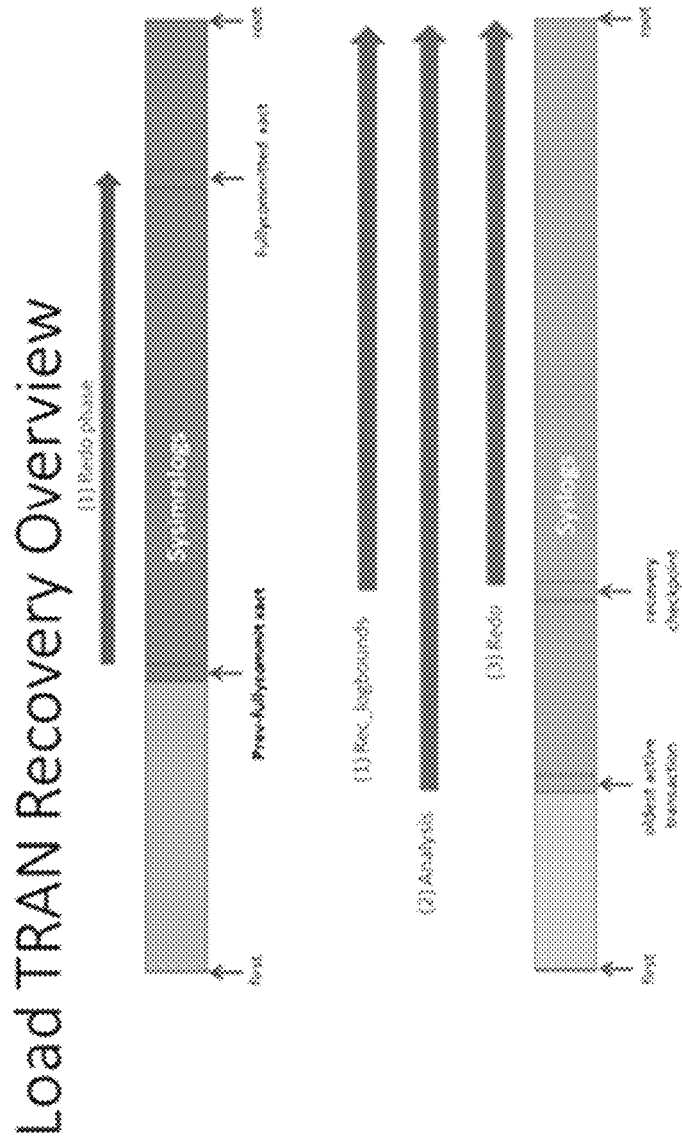
FIG. 14 illustrates an overview for load transaction operation recovery, in accordance with various implementations.

FIG. 14 illustrates an overview 1400 for load transaction operation recovery, in accordance with various implementations. Load transaction recovery can be similar to load database recovery, in that it may not have fix or reconciliation phases, but the difference being that the starting point of the redo phase can be the transaction after the fully committed transaction of the previous load recovery which can be denoted in a database information structure as a previously fully committed transaction.

Figure 15:
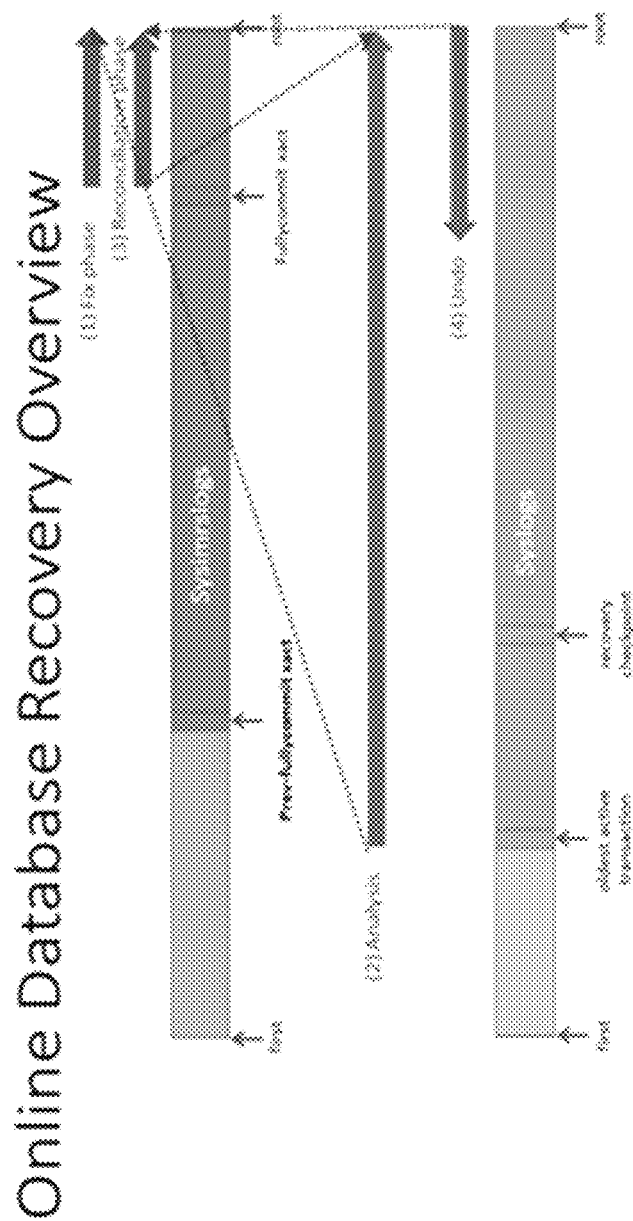
FIG. 15 illustrates an overview for online database recovery, in accordance with various implementations.

FIG. 15 illustrates an overview 1500 for online database recovery, in accordance with various implementations. Online database recovery may include fix phase and reconciliation, but may not include redo phase from oldest inserted transaction to fully committed transaction, because those transactions would have already been redone by previous load recovery.

Recovery Performance while Re-Instantiating the IMRS 210

Crash recovery, load database operation recovery, and/or load transaction operation recovery can work differently when recovering an IMRS-enabled database. As the IMRS 210 stores data that was active at the time of the crash (or at the time the database dump and/or transaction dump operations were taken), and as the log records directly reference these rows from the IMRS 210, the recovery process can operate directly in the IMRS 210. In other cases, even when objects or databases are bound to named caches, recovery can be performed in the default data cache, following which the default data cache can be purged of the pages from objects that are bound to other named caches. Post-recovery, at run-time the data can be again loaded from the disk into respective named caches.

The IMRS 210 can be created and/or manipulated like a cache, but it may not be considered a named cache (e.g., it can be generally considered as a memory pool). Unlike for recovery of objects that are bound to named caches, the data rows in the IMRS 210 can be recovered directly in the IMRS 210, using memory allocated during recovery. At the end of the recovery process, the IMRS 210 can be restored to exactly the same state as it was at the time of the crash, database dump operation, and/or the like.

Crash recovery of a database with a large IMRS 210 can require frequent memory allocation during the recovery process. During the recovery process, the kernel memory manager 234 can be frequently exercised to allocate memory of various sizes and/or other IMRS 210 metadata structures. When possible (e.g., depending on the implementation), multiple committed transactions may be recovered in parallel, with multiple recovery threads. One advantage due to the commit-time logging at run-time can be that there is no undo phase of recovery (e.g., no transaction rollback may be performed and/or no CLRs may be logged as part of recovery).

Another aspect can be that at run-time, a transaction may affect both ordinary tables and IMRS-enabled tables. For example rows affected by the same transaction, or even the same statement, can be in the page-based storage 320 and in the IMRS 210. This means a completed (for the case of recovery, this means a committed) transaction may span both system log 380 and IMRS log 370. At recovery time, the recovery of both these log-regions can be performed in parallel, and the completion status of each leg can be established independently.

Performance of crash recovery, while re-instantiating a very large IMRS 210 and/or when multiple IMRS-enabled databases with very large IMRSes 210 are recovered concurrently, can become a critical issue for making the database available post-crash.

Archive Management and IMRS 210 Configuration

Database archives created using the database dump and/or transaction dump operations can capture the contents of the ODRS as part of the archive. Loading the archives back using a load database and/or load transaction operations can re-instantiate the IMRS 210 from the contents in the archive followed by recovery, as needed, for the IMRS 210. Contents of the index, being fully logged, can be recovered as-is through the log records. Post-recovery, the index rows can point to the new location of the data rows which are resident in the IMRS 210. In-memory translation tables which convert the RID for such IMRS 210 resident rows to their physical addresses can provide transparent access.

The load process may not try to configure the row storage cache as part of the load operation and/or may be pre-established (e.g., by a user prior to the load itself). The expected usage can be that in the target server of the load operation, the target database has been created to use an existing row storage cache of the appropriate size. The archive header can contain some information about the cache configuration on the source server, which can be used to validate that the cache on the receiving server is adequately sized. The load process may still fail to re-store the contents of the ODRS captured in the archive to the target row storage cache. In some implementations, no attempt is made during the load to further reclaim memory from the cache by scavenging older rows and/or persisting them to the page-based storage 320.

Transaction Support for Commit Processing and Commit-Time Logging 240

At commit time, log records can be generated and flushed to the IMRS log 370. This can be different than what happens for DMLs on a non-IMRS-enabled table, where the log records can be generated in-line with the DML statement and/or where drip-logging through the PLC to the system log 380 can be performed. Commit-time logging permits the use of conflation (e.g., aggregated logging reflecting the final state of a row if it were updated multiple times in one transaction). It also allows for in-memory rollback without the need for additional logging. Therefore, in the IMRS log 370, only redo log records may be captured and/or there may be no need for an undo phase in future recovery from this catalog.

Commit-time logging may involve additional operation(s) relative to the in-line drip logging method. For example, all log records affecting in-memory rows may need to be generated as part of commit processing. This can involves "visiting" each of the affected rows and/or fabricating its log record to reflect the changes done to the row by this transaction. If several hundreds or thousands of rows are affected in one such transaction, the cost of generating the log records may be significant. However, this cost can be present even in a system where it can be spread out and/or amortized over each DML activity on a per-row basis.

In a two-store model, the notion of "hot" data can lead to a storage model where the table (or partition) can be split across the IMRS 210 and on-disk page-based storage 320. Thus, all access to data rows may need to be "aware," at some level, of these two storage formats.

In a one-index model, access to the data rows, either from the page-based storage 320 or the IMRS 210, can be driven through a B-tree mechanism. For example, a single index tree structure may span all of the rows in both storage regions. Appropriate navigation interfaces can be provided by the B-tree scan layer to traverse the leaf rows in the index, identify RIDs and/or VRIDs for the rows in the page-based storage 320 or IMRS 210, respectively, and/or provide the access method to those rows. From the query processing layer, a one-index storage model can have the advantage of simplifying the index access through just one index. All updates to the index pages and/or rows can occur with full logging. In some contexts, such indices can be referred to as "fully logged indices".

Some scalability and performance concerns may arise for the traversal of in-memory row structures at commit-time considering that multiple transactions may be committing simultaneously on different cores, and/or each one may be trying to read their own rows' data, which may cause some cache-line hits on high-end multi-core machines. In a drip-logging model, affected row(s) can be readily accessible, whereas for commit-time logging, at commit time the server may need to walk some transaction-local memory chains to locate the affected rows. Traversing memory during performance-critical commit-processing may cause some scalability issues.

Commit-time logging can be performed concurrently across different transactions that may be committing at the same time. This can allow for different committing transactions to be writing to their own "section" of the IMRS log 370 page chains, thereby reducing the overhead of synthesizing the log records, such as for DML operations affecting in-memory rows during the commit processing. Performing concurrent I/O to this catalog can remove another point of contention that end-of-commit processing sometimes sees in transactions that commit to the system log 380. As commit-time logging may not need or acquire an "end-of-log" exclusive access to the IMRS log 370 for writing the log records (e.g., like it may be done for the system log 380), even generating the log records for thousands of affected rows during a transaction's single window can be of minimal concern. This is in contrast to an end-of-log semaphore being acquired on the IMRS log 370, where log records can be generated for the thousands of affected rows. However, in some implementations, exclusive access to the IMRS log 370 can be obtained for a brief period while space can be reserved in the IMRS log 370 in order to generate the log records. The blocking access can be then released (e.g., immediately) after the space is reserved. Consequently, multiple threads that are committing simultaneously may be able to write to different sections of the IMRS log 370 after each of them has reserved its space for logging.

One of the important features for DMLs in IMRS 210 can be commit-time aggregated logging. For DMLs affecting rows in the page-based storage 320, each DML (e.g., Insert, Update, Delete) can generate a log record, which may be housed temporarily in the PLC. Over time, threads' PLC may be flushed, causing periodic writes to the system log 380. Over the life of a wide-span transaction, several PLC flushes may occur and/or there may be frequent writes to the end of the system log 380 chain. In recent releases, with the introduction of PLC blocks and/or chains of queued PLC blocks, the impact of continually flushing the PLC and constant writes to the end of system log 380 can be reduced. This behavior of continually generating log records and/or writing to/through the PLC can be referred to as in-line or drip logging.

In some aspects, for DMLs affecting rows in the IMRS 210, no drop logging may be performed. Instead, all logging to IMRS log 370 can be generated when the transaction commits. If a row updated multiple times within a transaction, as opposed to generating a log record for each update, commit-time logging can produce only one log record for the latest-image of the row. Commit-time logging can involve visiting the latest version of the rows affected by a transaction and/or generating the log-records for the affected rows. In contrast with drip logging, the generation of the log records can happen in-line with the DML. With commit-time logging, there can be more work to navigate through all the affected rows to generate the log records.

Commit-time logging can employ another performance technique. The committing transaction can reserve a block of space in IMRS log 370 before generating its log records, and then release the end of this catalog to other concurrently committing transactions. Other transactions that commit concurrently can similarly reserve their chunk of space to generate their log records. Consequently, multiple concurrently committing transactions can potentially be generating their log records and/or simultaneously writing to different sections of the IMRS log 370. This can be different from other systems where only one thread is be performing I/O writing to the end of system log 380. Therefore, in a highly concurrent transactional system, greater log throughput could be delivered while committing transactions to the IMRS 210.

Transaction Support for Rollback Processing

As transactions affecting IMRS 210 rows perform commit-time logging, no run-time or crash recovery 245 undo may be needed from log records in the IMRS log 370. Various forms of rollback can be supported, such as rollback transaction, rollback trigger, statement rollback due to an exception, command-rollback to handle unique constraint violations, rollback to a save point, and/or the like. Run-time rollback can be performed using the in-memory versions produced for DMLs. In some aspects, functionally, there may be little to no difference to the work done by the commit or rollback statements.

Rolling back a transaction that includes changes to rows in the page-based storage 320 and in the IMRS 210 can be performed as a two-part rollback. First, the changes affecting rows in the page-based storage 320 can be rolled back using in-line log records in the system log 380. Second, the changes affecting the rows in the IMRS 210 can be rolled back using in-memory row versions in the IMRS log 370.

For commit and/or rollback processing, the memory for intermediate row versions may not be released immediately upon transaction completion (commit or rollback). This work can be managed by the background memory garbage collection 280 thread, so that run-time transaction throughput can be unaffected. However, in case available memory falls below critical thresholds, end-of-transaction processing may revert to aggressive memory reclamation triggered (e.g., immediately) upon completion of the transaction. This may impact run-time transaction performance, but can help by releasing unused memory more quickly.

Trigger Processing in IMRS 210

Triggers can be used to implement business logic based on changes done to existing data (e.g., SQL constructs that include rules defining statements that violate rules). Triggers can run at the end of statements processing rows inserted and/or deleted by the statement. This can happen through inserted and/or deleted pseudo-tables which are handles to rows of that table inserted and/or deleted in that statement.

For instance, an insert can fire a trigger on the inserted table, and the inserted rows can be accessed in the body of the trigger using the pseudo-table name of the inserted table. Similarly, an update statement on a table may update several rows. To support triggers, changes from such statements can be logged using before-update and/or after-update row images in the system log 380. The before-update and/or after-update row images arising from the update statement can be referenced using pseudo-table handles called inserted and deleted tables. For ordinary page-based storage 320 tables (e.g., non-DRC enabled tables) the contents of these pseudo-tables can be synthesized using the before-after-image log records from the system log 380.

DRC enabled tables can support various forms of triggers, including multiple triggers on a table, enabling triggers, disabling triggers, and/or the like.

DML statements on IMRS-enabled tables 515 may process some rows in IMRS 210 and some rows in page-based storage 320. Trigger processing on IMRS 210 tables can work transparently on both types of rows. For rows in page-based storage 320, mechanisms of scanning log records generated by statements can be used. Based on these log records, inserted and/or deleted rows are determined. For rows in the IMRS 210 affected by a statement, log records may not be written until the transaction commits. However, trigger execution may need to occur at the end of the statement, and due to the fact that commit-time logging may be performed for rows affected in the DRC, at the end of the statement the log records needed to synthesize the inserted and/or deleted rows may not be available in the IMRS log 370.

Hence, to support the execution of triggers affecting DRC-enabled tables, in-memory row versions which are created by that statement can be used to determine rows inserted and/or deleted by that statement. The contents of the inserted and/or deleted pseudo-tables can be synthesized using the in-memory row versions produced for the DML statement.

For a statement affecting rows in both IMRS 210 and page-based storage 320, to determine inserted and/or deleted rows, internal trigger processing can scan the system log 380 for rows changed in the page-based storage 320 and the in-memory versions created for rows affected by the statement in the IMRS 210. The execution of the business logic implemented by the trigger can be transparent to the storage of the affected rows (e.g., either the page-based storage 320 or the IMRS 210).

For DMLs on rows in the IMRS 210 no in-line logging may be generated, but log records may be written only at commit-time to IMRS log 370. However, triggers can be fired at the end of a statement, at which time no log records would have been generated.

The rows for these pseudo-tables can be synthesized by the equivalent log records from the system log 380. For an IMRS-enabled table 515, the same data can be synthesized using the in-memory row versions that are maintained in the IMRS 210. As no run-time logging may be performed for DMLs on IMRS-enabled tables 515 and/or no system log 380 access and/or scan may be needed to generate the rows for the inserted and/or deleted tables, trigger performance can improve when triggers are fired on IMRS-enabled tables 515.

In some implementations, for the same statement, some updates and/or deletes may be done in the page-based storage 320 without migrating the rows to the IMRS 210, and/or other changes may be performed to rows that are already residing in the IMRS 210. For example, for the MERGE statement, when row caching is ON, insert commands can be done to the IMRS 210, while the updates may be performed only in the page-based storage 320 (e.g., under ILM strategies). Even without completely ILM-aware data row caching strategies, when row caching is OFF, a MERGE statement may end up inserting new rows to the page-based storage 320, and the update part of the MERGE may qualify rows that are already residing in the IMRS 210. This can result in some changes performed with logging in system log 380 and others performed with in-memory versioning. In such cases, a trigger that is fired on the affected table can be still able to synthesize the data for the inserted and/or deleted tables by accessing the changes from the system log 380, where applicable, and/or from the in-memory row versions for the updates, inserts, and/or deletes performed in the IMRS 210.

As referencing LOB columns in the body of a trigger via the inserted and/or deleted tables may not be allowed, much of the complexity of supporting LOB columns for DRC-enabled tables can be taken away when triggers on such tables are considered. As such, the triggers may not reference LOB columns via these pseudo-tables.

Instead-Of-Triggers (IOTs) defined on views created on DRC-enabled tables can be supported. The generation of the rows from the pseudo-tables can be supported by an internal and/or completely different in-memory work-table based row cache. However, LOB columns can be referenced in these pseudo-tables inside the body of an IOT defined on views. DMLs on views defined with IOTs can fire the corresponding trigger, and the affected rows can be generated from the plan-private worktable-based cache, including for LOB columns. For some systems, IOTs can be defined on views defined on DRC-enabled tables and/or LOB columns can be referenced in the body of such triggers. Access to such LOB columns can be done using the existing worktable based caching mechanism. As the triggers are fired at the end of each statement, only one version of a LOB column may be involved while generating the data for the pseudo-tables.

Pack Operations

Figure 16:
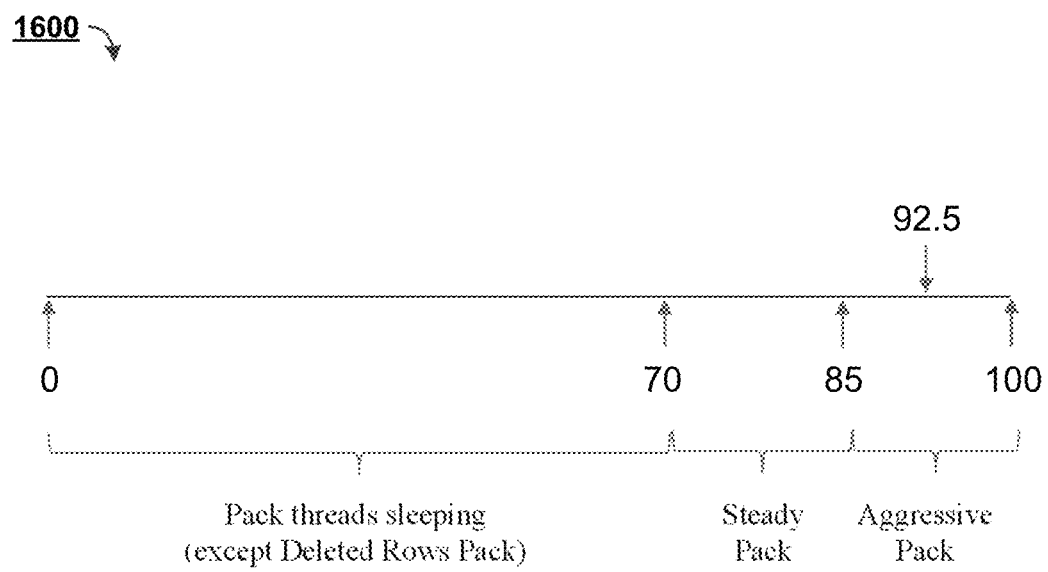
FIG. 16 illustrates an example of a pack operation, in accordance with various implementations.

A requirement to store all data in-memory makes such processing commercially costly and unviable for very large datasets. Accordingly, techniques are provided to keep hot data in-memory and store warm/cold data in disk based storage. This helps to reduce memory requirement for In-Memory Transaction processing. FIG. 16 illustrates an example of a pack operation 1600, in accordance with various implementations.

Pack can be a fully-logged and/or recoverable operation that moves "cold" data rows from the IMRS 210 to the page-based storage 320. Tight integration of the row cache with the page-storage and buffer caches can be provided, keeping in mind the access patterns to data rows in the IMRS 210. IMRS_PACK background threads can be provided that harvest infrequently used and/or accessed "cold" rows, and remove them from the IMRS 210 back to the page-based storage 320. This operation can be broadly referred to as pack, in a way to motivate the concept of packing off older, less used from an active work space.

Pack can be a data movement utility that moves data rows from the IMRS 210 to the page-based storage 320. Specifically, older rows in the IMRS 210 that are no longer transactionally active can be removed from the IMRS 210, moved to the page-based storage 320, and their memory (e.g., aggressively) reclaimed via garbage collection 280 for newer data. The pack operation can be a fully-logged and/or recoverable event that can be orchestrated to be reasonably online, non-blocking, and/or still allow for concurrent access to more recent transactionally active data. Pack can be designed to be interruptible, restartable, and/or recoverable via a load database operation, load transaction operation, after a crash, and/or the like.

The primary goal of the pack operation can be to free up memory used by older committed rows that are no longer needed and/or less frequently accessed. Pack operations can cooperates with garbage collection 280 to induce frequent memory reclamation. The IMRS log 370 can be a circular heap into which changes to the IMRS 210 are logged. Periodically space consumed by older committed transactions in the IMRS log 370 should be reclaimed to provide log space for newer activity. This process can be referred to as IMRS log 370 truncation. In some aspects, an older inserted row that is scanned heavily may be left in the IMRS 210 as it appears to be a "hot" read row, but that row's insert command log record in the IMRS log 370 may prevent log truncation. Pack can also be used to move the truncation point in the IMRS log 370 since it cannot be truncated beyond the transaction containing the oldest insert row log record. When this row is (or such rows are) packed back to the page-based storage 320, the truncation point can be moved forward.

Pack can move the rows for one partition at a time so that the data movement on the page-based storage 320 is clear about the target space for the rows being moved and/or packed. Pack can be performed by a background thread which cycles through various tables and/or partitions that are enabled for IMRS 210 usage and/or have rows in the IMRS 210. Each candidate partition's rows can be evaluated for packing based on several criteria and/or the qualifying rows harvested from the IMRS 210 and moved to the page-based storage 320. Some of the metrics applied to consider which rows to move off the row storage to the page-based storage 320 are:

(a) Frequency and recency of access to rows. "Cold" rows can be packed to the page-based storage 320. Row usage metrics tracked on a per-table basis can be used to select which rows from a table should be harvested and packed to the page-based storage 320. This way row-usage trends for a table can generally affect the choices of rows being removed from the IMRS 210;

(b) Total memory consumption in the IMRS 210. If memory usage thresholds are exceeded, pack operation can be done more aggressively, sometimes over-riding other criteria to reclaim memory from more rows; and (c) Memory usage footprint for individual tables. Rows from small tables may not be packed as often as rows from larger tables, which occupy more memory in the cache.

Different forms of pack can exist. For example, a Pack Flush may cause a pack of the rows to the page-store but leave behind a cached version of the row. Separately, a "normal" pack may be used to purge the row(s) from the IMRS 210. If future accesses to the row dictate (e.g., by ILM metrics) that it needs to be brought back to the IMRS 210, the row caching strategies can cache the row back to the IMRS 210. The core task can be data movement and the differences can be in what rows are harvested and/or their retention in the IMRS 210 post-pack. The various forms of pack can follow the model of working on one partition at a time and/or logging the rows that are moved.

For a "Normal" pack, at least a portion (e.g., all) of the harvested rows from the IMRS 210 comprising inserted rows and/or migrated rows can be moved to their respective target locations in the page-based storage 320. These rows can then be removed from the IMRS 210 so there can be only one instance of the row in the page-based storage 320 after the pack operation. Depending on the aggressiveness of the harvesting strategy, the IMRS 210 may have some or no rows left in it after a normal pack.

For a "Full" pack, at least a portion (e.g., all) of the rows from the IMRS 210 comprising inserted rows and/or migrated rows can be moved to their respective target locations in the page-based storage 320. These rows can then be removed from the IMRS 210, so there can be only one instance of the row in the page-based storage 320 after the pack operation. The IMRS 210 can be emptied of all rows following a full pack.

For a "migrated", only migrated rows may be harvested, applying heuristics and/or metrics around ILM evaluation and moving the rows to their respective target locations in the page-based storage 320. The qualifying rows can then be removed from the IMRS 210, so there may be only one instance of such rows in the page-based storage 320 after the pack operation. After a migrated pack operation, the IMRS 210 may still contain some migrated rows.

For an "all migrated" pack, all migrated rows may be considered, such as without applying the heuristics and/or metrics around ILM evaluation and moved to their respective target locations in the page-based storage 320. All the migrated rows can then be removed from the IMRS 210, so there may be only one instance of such rows in the page-based storage 320 after the pack operation. After a pack all migrated rows operation, the IMRS 210 may not contain any migrated rows.

The overall Pack mechanism can operates as follows:

(A) A background thread cycles through a list of tables with rows cached in the IMRS 210. Initially, a single thread can be spawned to work through the pack operations for all tables in all IMRS-enabled tables. Depending on workload and/or run-time heuristics such as IMRS 210 memory consumption, the number of IMRS-enabled databases, and/or the like, multiple background threads can be spawned automatically.

(B) Each partition in an IMRS-enabled table can be examined for its row-usage heuristics and/or cache-usage metrics. A set of rows considered as eligible for pack can be referred to as harvested rows.

(C) Pack may only deal with the latest committed versions of a row to move it to the page-based storage 320. Any memory reclamation for older versions of such packed rows can be handled by the memory garbage collection 280 thread. This memory reclamation may even happen asynchronously and/or delayed after the actual pack of the row(s) from the IMRS 210 to the page-based storage 320. Memory reclamation for the latest committed version of the row(s) that are packed may be performed aggressively by the garbage collection 280 thread cooperating with the pack thread.

(D) In the set of harvested rows, inserted rows can be packed to the page-based storage 320 by inserts. Required index updates can be performed.

(E) In the set of harvested rows, migrated rows can be packed to the page-based storage 320 by storing them at their home-row-location. This may involve updates to many different pages which can include pages where the row originally resided before row migration. The pack can be performed using logged-updates to the data pages.

(F) All the packed rows are removed from the IMRS 210 which can be fully-logged in one or both of the IMRS log 370 and the system log 380, and/or can be a recoverable operation. Concurrent access to rows can be prevented to the rows being packed by exclusive row locks. The pack operation can be performed in multiple short transactions for each partition, if needed, so that the extent of time that the rows remain locked can be kept as short as possible. Risks of loss in concurrency can be offset by the heuristics that harvest "cold" rows. Unless a full pack is being performed in a very busy system, access to rows that need to be packed should be low, thus, ex-row locks during the pack operation may not be a source of reduced performance for online transactions.

(G) If any cached rows are encountered in the set of harvested rows, they can be evicted from the IMRS 210 without requiring any changes to the page-based storage 320 data.

Pack may need to also deal with committed and/or deleted rows that are still in the IMRS 210 and/or cooperate with the garbage collection 280 facilities to perform immediate memory reclamation for such rows.

ILM 260 Support and Pack Operations

A differentiating feature of the systems and method described herein can be a tight integration with the data life-cycle patterns for transactional workloads. At run-time, information can be tracked to detect patterns of access to hot pages and/or to hot rows. The use of the IMRS 210 for row caching can leverage this information to optimally store "hot" rows in the IMRS 210 to deliver improved performance. When hot data becomes less frequently used in the IMRS 210, it may be replaced back in the page-based storage 320.

ILM and/or pack subsystems can work cooperatively to maintain IMRS 210 cache utilization to the value of a configuration option. Based on the value of this configuration option, a pack subsystem can decide to operate in different modes to maintain cache utilization to a requested/defined value. For example, at low cache utilization levels ILM may allow more rows to be brought into the IMRS 210, whereas at high cache utilization levels pack may aggressively move data out of the IMRS 210 to the page-based storage 320.

One of the objectives of this subsystem can be to ensure that no application outages (e.g., transaction/statement rollback) occur as a result of ILM decisions that do not make use of IMRS 210. The transactions can continue to operate using the page-based storage 320 which may result in slightly reduced performance but no loss of continuity. An IMRS 210 infrastructure can provide for execution of a single statement where some operations may affect rows in the page-based storage 320 and others in the IMRS 210. For example, a batch update statement affecting multiple rows may start by migrating an initial set of rows the IMRS 210 and then to avoid flooding the IMRS 210, the remaining rows continue to be updated in the page-based storage 320.

The SA 200 can monitor workload and/or try to identify partitions suited for the IMRS 210. For example, a table containing archive data may not be suited to IMRS 210 as it can be unlikely to have frequent selects/updates. Without partition tuning, data for such partitions may be brought into the IMRS 210 and packed without re-use, wasting CPU cycles and/or IMRS 210 cache space. This feature can be configured to detect such partitions' usages and/or disable the IMRS 210 usage by such partitions.

OLTP workloads often exhibits different access patterns to different data. Techniques described herein can help to make storage choices based on such access patterns of the workload system. This can be done by monitoring and/or synthesizing the workload running in the system with little impact to the transaction performance. The techniques can also adapt to the workload to alter its storage choices for the data. This storage choice can be completely transparent to the application and provide continuous data access using the SA 200. Access patterns in OLTP workload can be often closely related to partitions of data. Techniques described herein can help to make use of different access patterns of partitions to help make the storage choice decisions.

Storage choices may not be made at gross table or partition level and/or may be made at the level of individual row and type of operation (e.g., ISUD operations) being performed by the transaction. The granularity of the decision can help to keep the memory footprint lower to a current hot row-set. Using partition level access patterns in an OLTP workload to decide storage for data in the tiered storage can help to reduce memory footprint while providing the same performance compared to data stored in-memory.

Often, database systems store data on disk in the form of pages and/or use various caching techniques to keep important pages in-memory for quick processing. In-memory database engines often require that the entire data being processed by a query/transaction be stored in main memory. However, keeping all the data in the memory can increase installation costs. The SA 200 can provide a facility to store some part of data (hot data) in the IMRS 210 and the remaining bulk of the data (cold data) in disk based store (e.g., page-based storage 320). This can provide different tiered storage layers within the server. The SA 200 can also have the capability to provide transparent access to the data independent of its current storage and/or perform transaction processing on the data without any application change or impact. A transaction can generally process hot data in IMRS 210 and cold data on page-based storage 320. Additionally or alternately, a transaction can move data from the page-based storage 320 to the IMRS 210 if it finds the data as hot data and process it in the IMRS 210. Transaction processing done in-memory can leverage in-memory processing capabilities and/or take advantages of various optimizations so it can be faster than the page-based storage 320. The hot data in IMRS 210 can become cold/warm over the time and should be moved to page-based storage 320 to make main memory available for newer hot data. This data-flow can be referred as Information Life Cycle Management (ILM) 260. This data-aging can be performed across different data storage tiers, such as at a row level and/or inside the database server.

If techniques can effectively decide on hot-ness of data and place it optimally in IMRS 210, the size requirement for main memory footprint can be reduced while getting the performance gains of in-memory computing. This can be because the ILM techniques may ensure that most of the rows on which Business Transaction operate are stored in IMRS 210.

ILM techniques used in the SA 200 can identify hot data to store in IMRS 210 (while transactions are processing data, determine if the data being processed is hot, store it in IMRS 210, and/or process it in IMRS 210), and identify cold data to remove it from IMRS 210 (after transactions have stored data in IMRS 210, determine if it has become cold enough and/or is not expecting many more accesses and if so, move it to the page-based storage 320).

In OLTP workload, data often exhibits various access patterns and not all the data may be important enough to be kept in-memory all the time. Schemes described herein can help to solve above two problems largely rely on various aspects of data access patterns to decide which data to store/retain in-memory, such as the frequency of data access, contention on the page-based storage 320, the type of operation, the granularity of storage decision and/or the like.

Regarding the frequency of data access, it can be beneficial to generally keep the most often used data in memory and/or not to store or move in-frequently accessed data from the page-based storage 320. Not all data is accessed very often. Some of the sample access patterns can include data in some tables accessed almost all of the time (warehouse), data in some tables accessed very often for a short time that does not get accessed afterwards (latest orders in orders table), and/or data in some tables accessed rarely (history).

Storing a lot of not-often accessed data in memory increases the size of memory. With tiered storage, such data can be identified as cold data and be moved to page-based storage 320 from in-memory. Storing a lot of in-frequently accessed cold data in-memory increases the processing cost to move the data to the page-based storage 320 afterwards. Such a movement of data can be done in the background so it does not affect the transaction response time. However it does require some processing and can affect system throughput. Moving this data from the IMRS 210 to the page-based storage 320 can be referred to as a pack operation. If data can be accessed many times before it becomes cold and/or gets moved to page-based storage 320 then the cost of data movement can be amortized by the gains obtained by multiple in-memory operations on the data. Database servers can internally perform workload analysis at partition-level to determine which partitions are having contention and/or perform operations on them in the IMRS 210. Page level hotness checks may also be performed before performing operations on rows existing on the page-based storage 320, rather moving rows from such hot pages to the IMRS 210 and performing operations in-memory.

Often, page-based storage can be seen as non-performant due to page contention, latch contention, and/or the like. In-memory stores can use row-oriented architecture rather than page-oriented and/or can be written for modern hardware to support larger parallel processing, so they may not have contention problems like page-contention. For operations which generally lead to such kind of contention, performing the operations in-memory can provide large gains to transaction processing.

An example of such access pattern can be a heavily inserted table. Multiple connections can be inserting in the table and may get the same page to insert, which can lead to contention on the page if such inserts are performed in-memory. Potential contention conditions on page-based storage 320 can be identified and a decision can be made as to whether to perform such operations in-memory instead of in the page-based storage 320. Even though the data involved in such operations may not have high frequency of reuse after they are stored in-memory, storing the data in-memory can increase performance drops by avoiding contention problems on page-based storage 320 with the help of in-memory processing.

Regarding the type of operation, distinguishing among different types of operations (e.g., ISUD operations) can be beneficial. For example, some operations can cause data to be stored in-memory in order to process those operations. Not every operation on a table may access the hot data, as some operations access and create hot data while others perform an ad-hoc access to the data. For example, rows which get newly inserted (e.g., in orders table) may be used often in near future after the insert, as compared to a row which gets accessed by a SELECT operation on an old page-based storage 320 row (e.g., due to a daily reporting script). In this case, storing the row during the insert in-memory would provide more of a benefit as compared to the row accessed during the SELECT. Techniques described herein can help to distinguish between various types such operation using runtime statistics gathered from the workload and make choices to store data in-memory or not at an operation level.

Granularity of the storage decision can be an important aspect as all the data in a database/table/partition need not be simply hot or cold. Making hot/cold decisions at partition level to store all the data in-memory can lead to excessive memory requirements. Techniques described herein can help to perform storage decision during every operation on the row to decide if it needs to be stored in memory for faster access or not. The storage checks can be optimized to avoid performance impact due to checks. However, sometimes there can be partitions which can be considered either completely hot or completely cold, so partition (an operation) level storage choice decisions may be performed. For example, a warehouse table can always be in-memory (space dependent) whereas a history table that is generally not accessed, might never be in-memory.

The database storage space and buffer cache can be "extended" with the IMRS 210 as a caching layer to cache existing rows and/or store new data rows. New inserts can go directly to the IMRS 210 without requiring any page or buffer access, and subsequently may be updated directly in-memory. Updates to existing rows can cause the rows to be migrated to the IMRS 210, followed by an update. Deletes of rows existing in the page-based storage 320 may not cause any row migration. Deletes of in-memory rows may affect the page-based storage 320 for migrated rows. All updates to in-memory rows can be performed using in-memory versioning, a scheme that can be also used to support time-stamp based snapshot isolation for IMRS-enabled tables. In FIG. 5, the IMRS-enabled tables 515 that straddle the buffer cache 320 and the IMRS 210 reflect a behavior where, over time, only some part of the table may be in-memory. It may not be necessary for the entire table to be marked for in-memory storage. Access methods can transparently locate the row from one of the two stores, such as by using internal scan methods.

Page-based B-tree indices are enhanced to transparently scan rows either in the page-based storage 320 or in the IMRS 210. B-tree indices can be further enhanced using a latch-free concurrency control mechanism for enhanced performance. Table-specific non-logged, in-memory hash-indices built on top of lock-free hash tables, spanning only in-memory rows provide a fast-path performance accelerator under unique B-tree indices. Hash-indices are a key innovation arising out of this architecture and can be discussed in greater detail in future publications, but are used as part of the performance measurements done using this architecture as they do improve in-memory scan performance significantly.

Sub-systems can be provided to efficiently use IMRS 210 memory for hot data, without causing application outages. Information Lifecycle Management (ILM) strategies can be woven through the access methods to choose when data can be located in the IMRS 210 or in the page-based storage 320. Multi-threaded, non-blocking garbage collection (e.g., garbage collection 280) can be deployed to efficiently reclaim memory from older versions without affecting transaction performance. Pack can provide a sub-system that, in cooperation with the memory manager and/or based on ILM rules, efficiently relocates cold (transactionally inactive) data out of the IMRS 210 to the page-based storage 320 (buffer cache) to guarantee stable memory utilization and enhanced performance for OLTP activity. Transactions may span tables or data that can be in the page-based storage 320 or the IMRS 210, without any restrictions. Persistence and durability to data updated in the IMRS 210 can be provided through logging (e.g., within the IMRS log 370 and/or the system log 380). Enhancements to the performance of logging can be provided, such as through commit time aggregate logging.

A row may be stored in-memory at runtime when a transaction makes access to the row. During the first access to the row, it may not be easy to forecast if the row would be accessed frequently in the near future. This problem can be solved with the help of analysis of OLTP-transaction workload.

For example, auto IMRS 210 partition tuning can be used to disable and/or enable use of in-memory storage for certain operations (e.g., ISUD operations) on certain partitions by monitoring workload on rows in the IMRS 210 and the page-based storage 320. This technique can disallow storing rows in-memory for a partition if it finds the transaction workload in the system does not reuse the rows brought in to the IMRS 210 for that partition, and/or enable use of the IMRS 210 for a partition if performing operation(s) in memory may provide large performance gains over the page-based storage 320, due to issues like contention or change in workload and possibility of increase in reuse pattern for the rows in partition.

Considering an example of a new order table where a new order comes, the record can be inserted and the record can be deleted when the order is successfully processed and/or there are not many accesses (e.g., select command, update command, and/or the like.) to the record in between. Initially the SA 200 may start by allowing insert statement on this table to store rows in memory. As the transaction workload executes, the SA 200 can determine that the workload is not re-using the rows stored in IMRS 210 for this this table/partition. Due to low re-use rate the SA 200 can disallow the IMRS 210 use for this partition. The rows inserted thereafter may get inserted directly in the page-based storage 320. In this way it reduces the main-memory requirement for the table without affecting in-memory hit rate and/or performance. If the workload changes and/or the SA 200 is processing more requests than usual, the page-based storage 320 can start observing contention problems. The SA 200 can observes this and/or re-enable use of the IMRS 210 for the partition, helping the system to use the benefits of in-memory fast processing.

This technique can help to ensures that the in-memory storage can be used for different operations on the partitions only if such use can lead to benefits to later operation and/or avoid un-necessary use of the IMRS 210. This technique can be useful to deploy in-memory technology in large cloud installations. Enabling IMRS 210 for an entire table may require large memory and/or a user may not want to (or may not be able to) handpick hot tables as IMRS-enabled. This technique allows users to create all the tables to be IMRS-enabled and ensures that the server smartly uses the IMRS 210 if it benefits for a partition.

Regarding monitoring workload, in order to effectively perform workload analysis, some counters may need to be maintained by transaction execution. However, maintaining such counters can slow down the transaction performance especially in multi-core system due to cache-invalidations to increment or decrement the counters. To avoid this an efficient mechanism to monitor workload can aid in providing this functionality. This can be implemented using per-CPU core counters to capture various operations happening in the IMRS 210 and aggregating them across all the counters to get the current value of the counter. This can help to ensure that there is no cache invalidation to modify this counter, and memory for a counter can be assigned to a single core and/or always exist (e.g., in its L1/L2 Cache). ILM techniques can use one or more counters, such as memory used by a partition, number of rows stored in-memory for a partition, total number of operations which accessed row stored in-memory for the partition (re-use count), number of operations performed on pages in the partition, number of operations on page-based storage 320 which observed contention, and/or the like.

The partition tuning to make disablement and re-enablement decision can be performed by a background thread (e.g., self-tuning). This can be beneficial as the user may not need to execute some commands periodically for this to happen and/or the system can respond to the workload on its own (e.g., all the time). In some implementations, the background thread can wake up after a large number of transaction complete and/or look at the counters to observe various patterns and/or make decisions accordingly. The time window between such large number of transaction can be referred to as tuning window.

Partition tuning can be used to disable IMRS 210 usage for partitions based on workload analysis on operation performed in the IMRS 210. One or more heuristics can come into play for partition disablement, such as average reuse of rows, partition IMRS 210 utilization, IMRS 210 cache utilization, IMRS 210 usage by partition, and/or the like.

Partitions having low re-use rate for rows in IMRS 210 may not benefit much by storing rows in IMRS 210, rather they may unnecessarily consume the IMRS 210 cache. If a partition has a low re-use rate (e.g., average reuse of rows), then its IMRS 210 usage can be disabled. If footprint of a partition in IMRS 210 can be small (for example, <1% of the IMRS 210 cache may be considered low partition IMRS 210 utilization), it may not be considered for disablement. Such small partitions do not consume much of IMRS 210 cache, so disabling them may not gain much IMRS 210 cache capacity. This heuristic can also guard against premature disablement decisions when a table can be newly created. If in-memory storage has a lot of memory free (e.g., low IMRS 210 cache utilization) then none of the partitions might be considered for disablement. Is there is enough space in in-memory cache, it might not necessary to turn off IMRS 210 usage. This heuristic can protect against a premature disablement decision after server boot (e.g., when applications are initializing new partition accesses) or new database creation. If there are not enough new rows brought into the IMRS 210 for a partition (new IMRS 210 usage by partition), then it might not be considered for disablement. Slow growing partitions might not cause much of a load on the IMRS 210 cache. This heuristic can also help to avoid making a decision about disablement for a partition which is not significantly affected by current workload. For example, continent specific partitions may be accessed only in certain time intervals and those may not be disabled in a tuning interval simply because there is no activity on them. Hence, they can continue to remain IMRS-enabled when the activity resumes.

Regarding enabling in-memory operation partitions, when a partition is MRS-enabled the sever can start storing it's rows in the IMRS 210. However, Partition tuning may turn off IMRS 210 usage for the partition due to low re-use operation on the rows in IMRS 210 for the partition. However, such disablement can cause performance drop in some cases. This technique can internally determine such cases and re-enable use of IMRS 210 for such partitions based on contention on page-based storage 320 and/or increase in reuse operation. If a partition is disabled for IMRS 210 use and operation on page-based storage 320 observes contention, then such partitions may be again re-enabled for IMRS 210 use. This can ensure that if a partition can be disabled for IMRS 210 use and if such a decision causes performance drop due to page-based storage 320 contention then the IMRS 210 use for the partition can be again re-enabled. If the number of reuse operation on a partition during the tuning window increase compared to the tuning window in which the partition was disabled for IMRS 210 use then such partition can be again re-enabled for IMRS 210 use. This can ensure that if workload changes on a partition to have more re-use operations then such partitions are re-enabled.

An ILM rule engine can apply various rules to detect hot rows while executing ISUD statements in a transaction including, scan type, number of rows, data-page hotness/contention, cache usage, and/or the like.

Scan type rules can use access paths chosen for the statement as a hint to storage choice. For table scans, a complete table (page) can scan rows one page after another so for such statements, it can be optimal to scan data from page oriented page-based storage 320 rather than from row oriented in-memory storage due to L1/L2 cache hit rates. For this scan type rows may not be migrated to IMRS 210. For non-clustered index scans, data accessed belongs to different pages, so fetching data from page-based storage 320 would be slower compared to accessing it from in-memory row-storage. For this scan type rows can be migrated to IMRS 210 first. For clustered index scans, subsequent rows accessed during the scan can belong to same data page due to clustered-ness of index data. However, if the scan is on a very limited number of rows, then reading data from in-memory may be much better. In some aspects, data may be stored in the IMRS 210 during a clustered index scan only if it is scanning small set of rows, and otherwise the rows are kept in page-based storage 320.

If a statement is operating on a large number of rows, then it may be unlikely that all of the rows operated on are hot rows and/or will be accessed often. This rule allows a statement to bring only a small number of row to IMRS 210. This rule also acts as a throttling mechanism to limit bringing in a lot of rows in the IMRS 210 by a single statement and flooding of in-memory storage by a large statement. For example, an index scan which affects small number of rows seems more reasonable candidate for hot rows than a range scan affecting 70% of a large table.

Data-page hotness/contention rules can capture the non-blocking advantage of in-memory storage over the concurrency issues with page-oriented data storage methods. If a data-page is frequently accessed and/or updated concurrently, rows on it can benefit from the IMRS 210. Accordingly, if a number of concurrent and/or recent accessors of the data page are above a certain threshold, rows residing on that data page are considered hot and may be moved to the IMRS 210. Information for concurrent and/or recent accessors may be maintained to a data page, along with this data page.

Cache usage rules can be defined to prevent bringing new rows to IMRS 210 when utilization is very high. This can help in preventing out-of-memory errors when performing operations in IMRS 210 and also avoid performance issues when a system is running at high cache utilization.

Some of the hot-data which can be bought in memory by the transaction may not remain hot forever. Some of the row can become warm or cold after some time. It can be beneficial to remove such data from the IMRS 210 so the space can be made available for newer data to store in-memory. In the SA 200, a pack operation can be offloaded from user transactions and/or performed by background pack threads. Pack operations can be beneficial to keep the memory utilization of in-memory cache stable and/or ensure the cache has space to perform operations on hot data in-memory. The pack subsystem may need to balance the load of newer data coming to the IMRS 210 due to newer insert or operations on the existing hot data stored in the page-based storage 320.

It can be beneficial to identity if a data-row is cold or not before packing it. If a hot row is packed, then subsequent transaction may again access it and may try to bring it in memory. This not only wastes processing performed by the pack operation but also slows down transactions as they have to access hot data from page-based storage 320 and again store it to the IMRS 210. The IMRS 210 may have a lot of rows and/or a large number of the rows can be hot rows, so reaching colder rows quickly can be beneficial. If the pack operation spends a lot of time in finding such rows, then it can be inefficient and may not be able to keep with the new load coming to in-memory row storage.

In a running system users may want to keep utilization of in-memory cache stable and/or at a high value (e.g., 80%). Keeping it higher can be important as more hot data may be in the cache. Keeping it stable can also be important as it can help to ensure predictive performance. Often, when resource utilizations are high, systems start showing large variations in performance, which can be frustrating for users. To ensure a steady cache utilization, an internal threshold called a steady cache utilization percentage can be determined. Workload can increase the in-memory cache utilization whereas pack tries to decrease. The ILM schemes for transaction processing or pack can try to keep in-memory cache utilization percentage near to this value. This threshold can be used as follows to keep the cache utilization stable.

When cache utilization exceeds a "when to pack" threshold, a pack background thread can wake up and start in parallel to pack the data. If cache utilization is less than this threshold, pack operation may be not performed. If the cache utilization exceeds beyond a "pack aggressiveness" limit, then pack sub-systems can start packing more aggressively. To do so it can skip determining if a row is hot before packing and pack any row which it finds. Additionally or alternatively, it may also decide to increase number of pack threads so that more pack operation happen. If cache utilization grows even further (e.g., past a "stop new use" threshold) while aggressive packing is enabled, the server can decide to stop storing new rows in IMRS 210 until cache utilization drops below another threshold (e.g., due to pack). At least some (e.g., most or all) operations can be performed on page-based storage 320 meanwhile without causing any application outage. This ensures that the pack subsystem can be offloaded from newer data and needs to pack only the existing data in the IMRS 210.

Partition-level relaxed least recently used (LRU) queues can be leveraged to quickly locate the cold rows to perform a pack operation. For example, partition level queues with separate queues for each partition can be maintained as compared to one queue for rows in the database. Not all partitions have the same amount of cold data, so having separate queues for separate partitions can help to quickly locate data from a colder partition quickly. Further, an overall pack system can be driven with the help of workload analysis on different partition accesses. Multiple queues for each partition can additionally or alternatively be leveraged, where each partition has multiple queues based on operations which brought the rows into the IMRS 210. For example, separate queues for Select, Update, and/or Delete operations which bring rows into the IMRS 210 can be maintained. Having separate queues can help because hotness characteristics for each may be different. For example, access to new orders (e.g., reflected in inserted rows) could occur more than access to old rows processed by a reporting job (e.g., rows stored in-memory by a Select). Queue maintenance can be offloaded from transaction code paths and/or can be performed by background tasks using transaction traces, as maintaining such queues can become performance bottlenecks. This can help since it is not performed by transactions, transaction response time can be not affected. Additionally, queues often have contention problem when large number of tasks update them, so by using background threads (which can be in less numbers as compared to a number of active transactions), the contention to maintain such queues can be lowered.

Some of the rows stored in IMRS 210 may get deleted, and such deleted rows are not used by any transaction. A Pack subsystem can be configured to perform an aggressive pack of such rows. When a large number of deleted rows (e.g., >=1000) exist in a partition then the pack subsystem may pack these rows. Packing of deleted rows can also cause storage of the row on page-based storage 320 to be marked for deletion.

In an OLTP-workload the data coldness or aging can depend on table partitions, their sizes, and/or type of operations on the partitions. Analyzing these patterns can provide a lot of information regarding the cold data in the in-memory storage. Technique described herein can help to capture such patterns and identify cold rows based on access patterns to partition. Select, update, and/or delete command operations can re-use rows which are bought into the IMRS 210 by a previous operation. A partition having lower rate of re-use operation (e.g., with respect to a number of rows in IMRS 210) can have a higher number of cold rows compared to a partition having higher reuse rate. For example, a history table may have a very low reuse rate compared to an orders table, so a history table may have more cold data to pack. A table which is constantly growing can exhibit an access pattern where some part of data is hot for some time but may not be hot afterwards. On the other hand for small and stable tables, most of the rows can be equally hot and may not have a lot of cold data rows to pack.

A Pack subsystem can pack data in units referred to as a pack cycle. In each pack cycle, the pack subsystem can try to pack some (e.g., small) percentage of the current IMRS 210 cache. At the beginning of a pack cycle, the number of bytes to pack can be distributed among active partitions of IMRS-enabled tables 515. The distribution to different partitions can be done based on a current footprint of the partitions and/or their (re)usability in IMRS 210. This process can be referred to as partition apportioning for pack cycle. Packing of a target distributed to different partitions can be done in multiple, smaller pack transactions concurrently by pack threads. Once all target bytes are processed the current pack cycle can finish and the next pack cycle can start with latest metrics for the memory footprint and (re)usability.

In order to decide how each pack cycle distributes target bytes to the partitions, a Usefulness Index (UI) and/or a Cache Utilization Index (CUI) can be leveraged. The usefulness of rows for each partition can be determined by considering select, update, and/or delete operations that happened on the rows stored in memory for the partition. More SUD operations can mean more usefulness. It can be computed by averaging it across all IMRS-enabled partitions.

$$UI \text{ of a } ptn = \frac{\#SUD \text{ on rows in } IMRS \text{ of the partition}}{\#SUD \text{ on rows in } IMRS \text{ of all the partitions}}$$

The cache utilization can be determined by comparing memory consumption by a particular partition to cache utilization by other partitions. The larger partitions can be prime candidates for packing to make large amounts of memory available.

$$CUI \text{ of a } ptn = \frac{\#bytes \text{ used by partition in IMRS}}{\#bytes \text{ used by all other partitions}}$$

Based on these two indices a pack-ability index (PI) of the partitions can be computed as below. If a partition has high cache utilization, then usefulness may need to be higher, otherwise these rows can become candidates to be packed.

$$PI \text{ of a } ptn = \frac{CUI/UI \text{ of the partition}}{\text{sum of } (CUI/UI) \text{ for all partitions}}$$

Once PI is determined, the bytes to pack from each partition during a pack cycle can be determined by distributing bytes to pack in a pack cycle across all the partition in proportion to their pack index.

Bytes to pack for $ptn$=PI $ptn$*Bytes in Pack Cycle

The Pack subsystem can use a timestamp based filtering mechanisms to retain rows that are accessed recently as well as frequently in IMRS 210. Timestamp filtering mechanisms can filter rows based on most recent access to rows in IMRS 210. Both select and/or update commands can be counted as accesses. The SA 200 can internally maintain and/or learn the timestamp filter based on loads created on the IMRS 210 cache by current workload.

In a running system users may want to keep utilization of in-memory cache stable and at a higher value (e.g., 80%). This percentage can be referred to as steady cache utilization percentage. This steady percentage can apply to a Timestamp Filter (TSF) for an in-memory storage. Time Stamp Filter ($T$) can approximate the number of transactions which would cause memory utilization in the in-memory cache to increase by steady cache utilization percentage. If memory utilization has already reached a steady level, then pack may need to pack a row. With recent access being a parameter for determining hotness, a row which is being operated on by any of the last $T$ transactions should not be packed as it can be a hot row and the storage has more cold rows to pack. Databases usually maintain an atomic counter which can be incremented when each transaction in the database completes. This counter can be referred to as a database commit timestamp. Thus during pack operation, a row can be considered cold if its last access timestamp is greater than commit timestamp by at least $T$ value.

Row_Is_Cold=(commit-$ts(db)$-access_$ts(row)$)> $T$

A learning/tuning TSF delta can be performed heuristically by monitoring how many transactions in the workload cause memory usage to increase by small percentage (e.g., 1-5%) and then from that number extrapolating the number of transactions which would cause cache utilization to increase by steady cache percentage. This leaning can be performed by a background thread as transactions complete in the database. When a tuning cycle starts, current cache utilization and current commit timestamps (commit-ts) can be recorded (T1). During the tuning cycle, when memory utilization increases by the required percentage (P) current commit-ts can be recorded (T2). TSF ($T$) then can be computed as (T2−T1)*Steady Pct/P. To handle the change in workload, the SA 200 can relearn the TSF after some time.

Recentness and/or frequency of accesses to data can be considered while determining if a row can be cold/hot to pack. The TSF can be applied during pack operation. If a pack operation finds the difference between the current database timestamp and oldest modification timestamp of the row is less than the timestamp filter, then such rows are considered hot and are skipped for packing. This application of timestamp filtering considers recentness of access to the data rows. However, the timestamp filter may not be applied to all the partitions as some of the partitions may not have access patterns for very high row reuse. For such partitions, discarding rows to pack may not be desirable as it can waste the processing cost without much gains. In some aspects, a pack cycle mechanism can prioritize rows from such partitions to be packed first even if they are inserted/updated in IMRS 210 later than rows in some other high-reuse partitions. If reuse rate can be very low for a partition, timestamp filters may not be used to determine row hotness during pack.

This technique can help to ensure that the frequency of access to the data rows is considered.

$$\text{Reuse Rate} = \frac{\#SUD \text{ on rows in } IMRS \text{ of the partition}}{\#rows \text{ stored so far in } IMRS \text{ for this partition}}$$

Consider for example, due to page contention seen on page-based storage 320, ILM techniques can decide to perform an insert on a history table in the IMRS 210. However, this table has very low re-use rate so it can be desirable to pack early from this partition and make space available for newer data. Pack cycle heuristics can make sure that rows from this table are scheduled aggressively for packing. However, these rows could be very recently inserted in IMRS 210, but due to low reuse rate they would get packed as timestamp filter may not be applied on them.

Various ILM schemes can retain the hot data in memory and/or store the colder data in page-based storage 320. In some aspect, performance gains of in-memory processing can be obtained without storing all data in-memory, with the help of ILM techniques. The tiered in-memory storage backed with ILM techniques can achieve performance close to a system where all the data was stored in memory. Due to use of tiered storage and smart ILM techniques, memory requirements for in-memory processing can be reduced to the size of the active working dataset in the OLTP-transaction. The active working dataset may remain stable and/or constant performance gains with stable cache utilization in the system can be provided. The stable cache utilization can an important parameter for using technology in the field. To ensure the in-memory cache gets used to store only hot data, it can be important to have ILM strategies for both determining data hotness while storing data into in-memory cache and determining data coldness while packing/evicting data from in-memory cache. ILM techniques provided herein can be workload-characteristic-driven and/or make use of partition-specific workload patterns to easily and efficiently determine the data hotness and coldness. To perform fast in-memory processing, users need not pay for large memory, as smart ILM techniques can reduce the memory requirement without affecting performance by only the ensuring active dataset can be in memory and so reducing the cost to perform in-memory processing.

Figure 17:
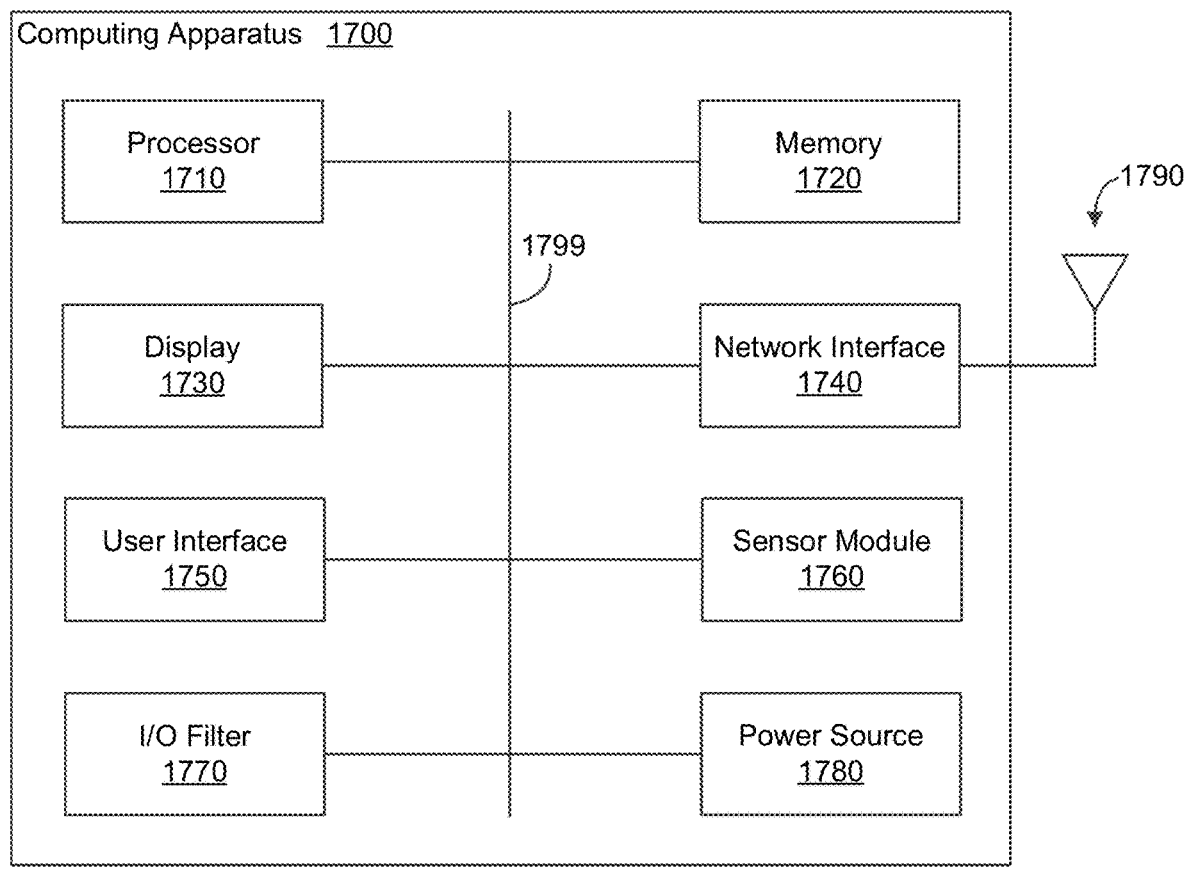
FIG. 17 illustrates an example computing apparatus, in accordance with some example implementations.

FIG. 17 illustrates an example computing apparatus 1700 which may be used to implement one or more of the described devices and/or components, in accordance with some example implementations. For example, at least a portion of the computing apparatus 1700 may be used to implement at least a portion of the computing device 110, an apparatus providing the database 120, an apparatus providing the external software 130, one or more of the user access devices 140, an access device 165, and/or the like. Computing apparatus 1700 may perform one or more of the processes described herein.

As illustrated, computing apparatus 1700 may include one or more processors such as processor 1710 to execute instructions that may implement operations consistent with those described herein. Apparatus 1700 may include memory 1720 to store executable instructions and/or information. Memory 1720 may include solid-state memory, solid-state disk drives, magnetic disk drives, or any other information storage device. In some aspects, the memory 1720 may provide storage for at least a portion of a database (e.g., the database 120 or some other organization of data). Apparatus 1700 may include a network interface 1740 to a wired network or a wireless network, such as the network 160 of FIG. 1. Wireless networks may include Wi-Fi, WiMAX, and cellular networks (2G/3G/4G/5G), and/or any other wireless network. In order to effectuate wireless communications, the network interface 1740, for example, may utilize one or more antennas, such as antenna 1790.

Apparatus 1700 may include one or more user interface, such as user interface 1750. The user interface 1750 can include hardware or software interfaces, such as a keyboard, mouse, or other interface, some of which may include a touchscreen integrated with a display 1730. The display 1730 may be used to display information to a user, provide prompts to a user, receive user input, and/or the like. In various implementations, the user interface 1750 can include one or more peripheral devices and/or the user interface 1750 may be configured to communicate with one or more peripheral devices.

In some aspects, the user interface 1750 may include one or more sensors and/or may include an interface to one or more sensors. The operation of these sensors may be controlled at least in part by a sensor module 1760. The apparatus 1700 may also comprise and input and output (I/O) filter 1770, which can filter information received from the sensors or other user interfaces 1750, received and/or transmitted by the network interface 1740, and/or the like. For example, signals detected through sensors can be passed through the I/O filter 1770 for proper signal conditioning, and the filtered data may then be passed to the sensor module 1760 and/or processor 1710 for validation and/or processing. The apparatus 1700 may be powered through the use of one or more power sources, such as power source 1780. As illustrated, one or more of the components of the apparatus 1700 may communicate and/or receive power through a system bus 1799.

FIG. 18 illustrates a flowchart of a method for an in-memory row storage architecture, in accordance with some example implementations. In various implementations, the method 1800 (or at least a portion thereof) may be performed by one or more of the computing system 110, an apparatus providing the database 120, an apparatus providing the external software 130, a user access device 140, one or more of the IoT devices 150, the access device 165, the computing apparatus 1700, other related apparatuses, and/or some portion thereof. In some aspects, the apparatus 1700 may be regarded as a server.

Method 1800 can start at operational block 1810 where the apparatus 1700, for example, can determine, based on one or more accesses of data stored at a first location in a persistent memory page store, that the data is active.

Method 1800 can proceed to operational block 1820 where the apparatus 1700, for example, can copy, in response to determining that the data is active, the data to a second location in an in-memory row store. In some implementations, the data comprises at least one row from a database table having a plurality of rows, wherein a first portion of the plurality of rows is stored in the in-memory row store, and wherein a second portion of the plurality of rows is stored in the persistent page store.

Method 1800 can proceed to operational block 1830 where the apparatus 1700, for example, can index, in response to determining that the data is active, the data in an index table.

Method 1800 can proceed to operational block 1840 where the apparatus 1700, for example, can access, based on the index table, the data at the second location in the in-memory row store to perform an update of the data. In some aspects, method 1800 can additionally or alternatively include the apparatus 1700, for example, providing the update of the data within the in-memory row store. In some aspects, the update is not provided within the persistent page store. For example, the update may not be provided to the persistent page store at the time it is provided to the in-memory row store, the update may not be provided to the persistent page store until the data becomes inactive, and/or the update may not be provided to the persistent page store because it may become obsolete by the time the data becomes inactive.

In some aspects, method 1800 can additionally or alternatively include the apparatus 1700, for example, generating new data based on a database query and/or inserting the new data into the in-memory row store, wherein the new data is not inserted into the persistent page store until the new data is determined to be inactive.

In some aspects, the index table comprises indices for each row in the in-memory row store, and wherein each of the indices comprises an indication of an identifier for a physical page in the persistent page store, an indication of a row number in the physical page, an indication of an identifier for a virtual page in the in-memory row store, and an indication of a row number in the virtual page. In some related aspects, method 1800 can additionally or alternatively include the apparatus 1700, for example, processing a database query requiring access to second data and/or determining a third location of a most recent version of the second data based on an index for the second data in the index table, wherein the third location is within the persistent page store or the in-memory row store, and wherein the index provides transparent access for the database query to the second data.

In some aspects, method 1800 can additionally or alternatively include the apparatus 1700, for example, processing a plurality of transactions comprising a plurality of database statements (e.g., SQL IUD statements), logging each transaction of the plurality of transactions that affect the in-memory row store within a transaction log in a persistent disk location when the transaction is committed, determining that a crash or a power down occurred, and/or recovering at least a portion of the in-memory row store after determining that the crash or the power down occurred based on accessing the transaction log. In some related aspects, method 1800 can additionally or alternatively include the apparatus 1700, for example, logging changes made by each statement (e.g., individually) of the plurality of database statements that affect the persistent page store within the transaction log when the statement is executed, applying changes made by each statement of the plurality of database statements that affect the in-memory row store to the in-memory row store by creating in-memory row versions when the statement is executed, determining whether the statement violates a trigger rule at the end of execution of each statement of the plurality of database statements, processing the trigger rule using the in-memory row versions to modify the in-memory row store when the statement violates the trigger rule, and/or processing the trigger rule using the transaction log to modify the persistent page store when the statement violates the trigger rule.

In some aspects, method 1800 can additionally or alternatively include the apparatus 1700, for example, determining that an available amount of space in the in-memory row store is insufficient, determining that second data in the in-memory row store is inactive, and/or migrating the second data from the in-memory row store to the persistent page store in response to determining that the available amount of space is too small, wherein the amount of space is insufficient when a current transaction cannot complete based on the available amount of space and/or when the available amount of space is less than a threshold. In some related aspects, determining that the data is active comprises determining that the one or more accesses include the update to the data, and wherein determining that the second data is inactive comprises determining that the second data has not been accessed within a threshold period of time or determining that the second data is a least recently used row in the in-memory row store.

In some aspects, execution of at least a portion of the method 1800 can provide for uniform and/or transparent access of data (e.g., rows, tables, partitions, and/or the like) regardless of the location of the data (e.g., in-memory or in a persistent page store). Additionally or alternatively, execution of at least a portion of the method 1800 can provide lock-based standards-compliant (e.g., American National Standards Institute (ANSI) standards) transaction isolation levels, such as read-committed, repeatable reads, serializable isolation, and/or the like without loss of ACID semantics. In some aspects, execution of at least a portion of the method 1800 can provide full application and/or SQL statement compatibility, such as by not restricting access to database statements and/or queries based on the location of the data.

Although several aspects are described herein with respect to the IMRS 210, other implementations are possible. For example, other in-memory database systems can be enhanced through the use of at least some of the techniques described herein.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    at least one processor; and
    at least one memory storing instructions which, when executed by the at least one processor, cause operations comprising:
        determining, based on one or more accesses of data stored at a first location in a persistent page store, that the data is active;
        copying, in response to determining that the data is active, the data to a second location in an in-memory row store;
        indexing, in response to determining that the data is active, the data in an index table, the index table comprising indices for rows in the in-memory row store to enable mapping between a virtual page in the in-memory row store and a physical page in the persistent page store; and
        accessing, based on the index table, the data at the second location in the in-memory row store to perform an update of the data.

2. The system of claim 1, wherein the operations further comprise:
    providing the update of the data within the in-memory row store, wherein the update is not provided within the persistent page store.

3. The system of claim 1, wherein the operations further comprise:
    generating, based on a database query, new data; and
    inserting the new data into the in-memory row store, wherein the new data is not inserted into the persistent page store until the new data is determined to be inactive.

4. The system of claim 1, wherein the index table comprises indices for each row in the in-memory row store, and wherein each of the indices comprises:
    an indication of an identifier for a physical page in the persistent page store;
    an indication of a row number in the physical page;

an indication of an identifier for a virtual page in the in-memory row store; and an indication of a row number in the virtual page.

5. The system of claim 4, wherein the operations further comprise:

processing a database query requiring access to second data; and determining a third location of a most recent version of the second data based on an index for the second data in the index table, wherein the third location is within the persistent page store or the in-memory row store, and wherein the index provides transparent access for the database query to the second data.

6. The system of claim 1, wherein the data comprises at least one row from a database table having a plurality of rows, wherein a first portion of the plurality of rows is stored in the in-memory row store, and wherein a second portion of the plurality of rows is stored in the persistent page store.

7. The system of claim 1, wherein the operations further comprise:

processing a plurality of transactions comprising a plurality of database statements;

logging, within a transaction log in a persistent disk location, each transaction of the plurality of transactions that affect the in-memory row store when the transaction is committed;

determining that a crash or a power down occurred; and recovering, after determining that the crash or the power down occurred, at least a portion of the in-memory row store based on accessing the transaction log.

8. The system of claim 7, wherein the operations further comprise:

logging, within the transaction log, changes made by each statement of the plurality of database statements that affect the persistent page store, when the statement is executed;

applying changes made by each statement of the plurality of database statements that affect the in-memory row store to the in-memory row store by creating in-memory row versions, when the statement is executed;

determining, at the end of execution of each statement of the plurality of database statements, whether the statement violates a trigger rule;

processing, when the statement violates the trigger rule, the trigger rule using the in-memory row versions to modify the in-memory row store; and processing, when the statement violates the trigger rule, the trigger rule using the transaction log to modify the persistent page store.

9. The system of claim 1, wherein the operations further comprise:

determining that an available amount of space in the in-memory row store is insufficient, wherein the amount of space is insufficient when a current transaction cannot complete based on the available amount of space and/or when the available amount of space is less than a threshold;

determining that second data in the in-memory row store is inactive; and migrating, in response to determining that the available amount of space is too small, the second data from the in-memory row store to the persistent page store.

10. The system of claim 9, wherein determining that the data is active comprises determining that the one or more accesses include the update to the data, and wherein determining that the second data is inactive comprises determining that the second data has not been accessed within a threshold period of time or determining that the second data is a least recently used row in the in-memory row store.

11. A method comprising:

determining, based on one or more accesses of data stored at a first location in a persistent page store, that the data is active;

copying, in response to determining that the data is active, the data to a second location in an in-memory row store;

indexing, in response to determining that the data is active, the data in an index table, the index table comprising indices for rows in the in-memory row store to enable mapping between a virtual page in the in-memory row store and a physical page in the persistent page store; and accessing, based on the index table, the data at the second location in the in-memory row store to perform an update of the data.

12. The method of claim 11, further comprising:

providing the update of the data within the in-memory row store, wherein the update is not provided within the persistent page store.

13. The method of claim 11, further comprising:

generating, based on a database query, new data; and inserting the new data into the in-memory row store, wherein the new data is not inserted into the persistent page store until the new data is determined to be inactive.

14. The method of claim 11, wherein the index table comprises indices for each row in the in-memory row store, and wherein each of the indices comprises:

an indication of an identifier for a physical page in the persistent page store;

an indication of a row number in the physical page;

an indication of an identifier for a virtual page in the in-memory row store; and an indication of a row number in the virtual page.

15. The method of claim 14, further comprising:

processing a database query requiring access to second data; and determining a third location of a most recent version of the second data based on an index for the second data in the index table, wherein the third location is within the persistent page store or the in-memory row store, and wherein the index provides transparent access for the database query to the second data.

16. A non-transitory computer-readable medium comprising computer program code which, when executed by at least one processor, results in operations comprising:

determining, based on one or more accesses of data stored at a first location in a persistent page store, that the data is active;

copying, in response to determining that the data is active, the data to a second location in an in-memory row store;

indexing, in response to determining that the data is active, the data in an index table, the index table comprising indices for rows in the in-memory row store to enable mapping between a virtual page in the in-memory row store and a physical page in the persistent page store; and accessing, based on the index table, the data at the second location in the in-memory row store to perform an update of the data.

17. The non-transitory computer readable medium of claim 16, wherein the operations further comprise:

providing the update of the data within the in-memory row store, wherein the update is not provided within the persistent page store.

18. The non-transitory computer readable medium of claim 16, wherein the operations further comprise:
generating, based on a database query, new data; and
inserting the new data into the in-memory row store, wherein the new data is not inserted into the persistent page store until the new data is determined to be inactive.

19. The non-transitory computer readable medium of claim 16, wherein the index table comprises indices for each row in the in-memory row store, and wherein each of the indices comprises:
an indication of an identifier for a physical page in the persistent page store;
an indication of a row number in the physical page;
an indication of an identifier for a virtual page in the in-memory row store; and
an indication of a row number in the virtual page.

20. The non-transitory computer readable medium of claim 19, wherein the operations further comprise:
processing a database query requiring access to second data; and
determining a third location of a most recent version of the second data based on an index for the second data in the index table, wherein the third location is within the persistent page store or the in-memory row store, and wherein the index provides transparent access for the database query to the second data.

* * * * *